(12) United States Patent
Takenaga

(10) Patent No.: US 8,381,548 B2
(45) Date of Patent: Feb. 26, 2013

(54) METHOD OF MANUFACTURING PHOTONIC BAND GAP FIBER BASE MATERIAL AND FIBER

(75) Inventor: Katsuhiro Takenaga, Sakura (JP)

(73) Assignee: Fujikura Ltd., Tokyo (JP)

( * ) Notice: Subject to any disclaimer, the term of this patent is extended or adjusted under 35 U.S.C. 154(b) by 0 days.

(21) Appl. No.: 13/338,834

(22) Filed: Dec. 28, 2011

(65) Prior Publication Data
US 2012/0151968 A1  Jun. 21, 2012

Related U.S. Application Data

(63) Continuation of application No. PCT/JP2010/060578, filed on Jun. 22, 2010.

(30) Foreign Application Priority Data

Jun. 29, 2009  (JP) ................................. 2009-154429

(51) Int. Cl.
*C03B 37/15* (2006.01)
(52) U.S. Cl. ................. 65/409; 65/390; 65/406; 65/408
(58) Field of Classification Search ............ 65/390, 65/406
See application file for complete search history.

(56) References Cited

U.S. PATENT DOCUMENTS

| 8,213,077 | B2 * | 7/2012 | Dong et al. ................ 359/341.1 |
| 2002/0118938 | A1 * | 8/2002 | Hasegawa et al. ............ 385/125 |
| 2008/0199135 | A1 * | 8/2008 | Proulx ......................... 385/123 |
| 2008/0247721 | A1 * | 10/2008 | Guan et al. .................. 385/125 |

FOREIGN PATENT DOCUMENTS

| JP | 2003-029073 A | 1/2003 |
| JP | 2008-226885 A | 9/2008 |
| JP | 4243327 B2 | 3/2009 |
| WO | 2008/126472 A1 | 10/2008 |

OTHER PUBLICATIONS

International Search Report of PCT/JP2010/060578, mailing date Aug. 10, 2010.

\* cited by examiner

*Primary Examiner* — Queenie Dehghan
(74) *Attorney, Agent, or Firm* — Westerman, Hattori, Daniels & Adrian, LLP

(57) ABSTRACT

A method of manufacturing a photonic band gap fiber base material includes: a forming step of continuously forming a columnar core glass body 10 and a clad glass body 20 which coats the core glass body to obtain an intermediate base material 110; a hole making step of making holes 30 in the clad glass body 20; an insertion step of inserting in the holes 30 a plurality of bilayer glass rods 40 in which an outer layer 42 which has the same refractive index as the clad glass body coats high refractive index portions 41 having a higher refractive index than a refractive index of the clad glass body 20; and a heating step of heating the intermediate base material 110 and integrating the intermediate base material 110 and the bilayer glass rods 40.

13 Claims, 18 Drawing Sheets

METHOD OF MANUFACTURING PHOTONIC BAND GAP FIBER BASE MATERIAL AND FIBER

TECHNICAL FIELD

The present invention relates to a method of manufacturing a photonic band gap fiber base material and a method of manufacturing a photonic band gap fiber.

BACKGROUND ART

Photonic band gap fibers are known as one of optical fibers used for optical communication or in fiber laser devices. Further, as one of photonic band gap fibers, there are photonic band gap fibers provided with a plurality of high refractive index portions including a material having a high refractive index than a core in a clad which coats the core, and the photonic band gap fibers are used as optical filters or polarization maintaining optical fibers.

The following Patent Document 1 discloses an example of such photonic band gap fibers. The photonic band gap fiber disclosed in the Patent Document 1 has a core with which a rare earth element is doped and a clad which coats the core, and, in the clad, periodic structure areas in which a plurality of high refractive index portions are aligned in a triangular grid pattern are formed to sandwich the core. According to Patent Document 1, the periodic structure areas can restrict propagation of a wavelength which does not need to be amplified among spontaneous emission light emitted from the rare earth element.

Further, the following Patent Document 2 discloses a method of manufacturing a photonic band gap fiber. With the method of manufacturing a photonic band gap fiber, first, a glass rod which becomes a core with which a rare earth element is doped, bilayer glass rods in which high refractive index portions having a higher refractive index than silica are coated by an outer layer made of silica, and a silica tube which is made of silica are prepared. Next, in a penetration hole of the silica tube, a glass rod which becomes a core is arranged in the center of the penetration hole, and the bilayer glass rods are arranged around the core. Next, the silica tube in which the glass rod which becomes a core and the bilayer glass rods are arranged is heated in vacuum to fill the gap in the penetration hole in the silica tube and manufacture a photonic band gap fiber base material. Further, the photonic band gap fiber base material is drawn to obtain a photonic band gap fiber.

CITATION LIST

Patent Document

Patent Document 1: Japanese Patent No. 4243327
Patent Document 2: Japanese Patent Application Laid-Open No. 2008-226885

SUMMARY OF INVENTION

Objects to be Achieved by the Invention

As disclosed in the above Patent Document 1, a method of manufacturing a photonic band gap fiber in which periodic structure areas in which a plurality of high refractive index portions are aligned in a triangular grid pattern are formed to sandwich the core, using the manufacturing method disclosed in Patent Document 2 is as follows. That is, as illustrated in FIG. 27, with the manufacturing method disclosed in the above Patent Document 2, first, a glass rod 10A which becomes a core, glass rods 22A which become clads and have the same refractive index as silica and bilayer glass rods 40A in which the high refractive index portions 41A having a higher refractive index than silica are coated by the outer layers 42A having the same refractive index as silica are prepared. Further, in a penetration hole of a silica tube 20A, the glass rod 10A which becomes a core is arranged in the center of the penetration hole, and, furthermore, the bilayer glass rods 40A are arranged to provide periodic structures on the left and right sides of the glass rod 10A which becomes the core. In this case, the bilayer glass rods 40A are aligned to sandwich the core. Further, the glass rods 22A are arranged in other portions in the penetration hole. Furthermore, by heating the silica tube 20A in vacuum in a state where the glass rods are inserted in the silica tube 20A in this way, a photonic band gap fiber base material is manufactured. Next, by drawing the photonic band gap fiber base material, it is possible to obtain the photonic band gap fiber as disclosed in Patent Document 1.

However, when the photonic band gap fiber disclosed in Patent Document 1 is manufactured according to the manufacturing method disclosed in the above Patent Document 2, the manufactured photonic band gap fiber causes significant transmission loss of light.

It is therefore an object of the present invention to provide a method of manufacturing a photonic band gap fiber base material which can manufacture a photonic band gap fiber which can suppress transmission loss of light, and a method of manufacturing a photonic band gap fiber.

Means for Achieving the Objects

To solve the above problem, the inventors of the present invention actively studied the cause that the photonic band gap fiber manufactured according to the manufacturing method disclosed in Patent Document 2 causes significant transmission loss of light. As a result, the inventors have found the cause that transmission loss of light becomes significant because, with the core of the photonic band gap fiber manufactured according to the manufacturing method disclosed in Patent Document 2, damages are left on or an impurity adheres to a surface of the core.

Hence, the inventors of the present invention have further studied the method of manufacturing a photonic band gap fiber which can prevent the surface of the core from being damaged or an impurity from adhering to the surface, and arrived at the present invention.

That is, the method of manufacturing a photonic band gap fiber base material according to the present invention includes: a forming step of continuously forming a columnar core glass body which becomes a core and a clad glass body which becomes a clad and coats an outer periphery of the core glass body to obtain an intermediate base material; a hole making step of making holes in the clad glass body along a longitudinal direction of the core glass body; an insertion step of inserting in the holes a plurality of bilayer glass rods which have a columnar high refractive index portion having a higher refractive index than a refractive index of the clad glass body and an outer layer which has the same refractive index as the clad glass body and coats an outer periphery of the high refractive index portion; and a heating step of heating the intermediate base material in which the bilayer glass rods are inserted in the holes and integrating the intermediate base material and the bilayer glass rods.

According to the method of manufacturing the photonic band gap fiber base material, the core glass body and clad glass body are continuously formed, so that it is possible to prevent the surface of the core glass body from being damaged or prevent an impurity from adhering to the surface. Further, by drawing the photonic band gap fiber base material, a plurality of high refractive index portions are formed in the clad by the high refractive index portions of the bilayer glass rods, so that it is possible to manufacture a photonic band gap fiber which suppresses damages or an impurity in interfaces between the core and clad.

Furthermore, according to the method of manufacturing the photonic band gap fiber base material, it is possible to flexibly adjust the positions of the holes made in the clad glass body and freely adjust positions of the high refractive index portions in the photonic band gap fiber.

Still further, with the above method of manufacturing the photonic band gap fiber base material, a shape of a periphery of the holes is preferably circular in a vertical cross section of the intermediate base material in a length direction.

By making the shape of the periphery of the holes circular in the cross section of the intermediate base material in this way, it is possible to easily make the holes by mechanical means and easily perform hole making step. Further, the shape of the periphery of the holes is circular, so that it is possible to flexibly rotate alignment of a plurality of bilayer glass rods in a circumferential direction of the holes. Consequently, it is possible to flexibly adjust the orientation of alignment of the bilayer glass rods in the insertion step. By using the photonic band gap fiber base material, it is possible to easily manufacture a photonic band gap fiber in which a plurality of high refractive index portions are arranged to overlap one line extending in a radial direction passing the center in the cross section, or a photonic band gap fiber in which alignment of a plurality of high refractive index portions is inclined without overlapping the line extending in the radial direction passing the center in the cross section.

In addition, with the above method of manufacturing the photonic band gap fiber base material, a shape of a periphery of the holes is preferably regular hexagonal in a vertical cross section of the intermediate base material in a length direction.

By making the shape of the periphery of the holes regular hexagonal in the cross section of the intermediate base material, it is possible to closely pack glass rods having the same diameter in the holes. Further, the shape of the periphery of the holes in the cross section is not circular, so that alignment of a plurality of bilayer glass rods is prevented from moving in the circumferential direction of the holes. Consequently, it is possible to easily fix the bilayer glass rods or glass rods to the holes.

In addition, with the above method of manufacturing the photonic band gap fiber base material, a shape of a periphery of the holes in a vertical cross section of the intermediate base material in a length direction preferably has an outer periphery of two partially overlapping circles having the same diameter.

With this configuration, two holes having the circular shape of the peripheries in the cross section only need to be made to partially overlap in the hole making step, so that it is possible to easily form the holes by means of mechanical means. Consequently, it is possible to easily perform the hole making step. Further, the shape of the periphery of the holes in the cross section is not circular, so that, after the insertion step, it is possible to prevent alignment of a plurality of bilayer glass rods from moving in the circumferential direction of the holes, and easily fix the bilayer glass rods or glass rods to the holes.

Furthermore, with the above method of manufacturing the photonic band gap fiber base material, in the insertion step, a glass rod which has a cross sectional shape from which part of a circle having a slightly smaller diameter than the two circles is linearly cut, and which has the same refractive index as the clad glass is preferably inserted together with the bilayer glass rods.

By configuring the insertion step in this way, it is possible to prevent a plurality of small gaps from being made in portions other than portions of holes in which the bilayer glass rods are inserted, and manufacture a precise photonic band gap fiber base material.

Further, with the above method of manufacturing the photonic band gap fiber base material, the core glass body may be doped with a rare earth element.

Furthermore, the method of manufacturing a photonic band gap fiber according to the present invention includes: a forming step of continuously forming a columnar core glass body which becomes a core and a clad glass body which becomes a clad and coats an outer periphery of the core glass body to obtain an intermediate base material; a hole making step of making holes in the clad glass body along a longitudinal direction of the core glass body; an insertion step of inserting in the holes a plurality of bilayer glass rods which have a columnar high refractive index portion having a higher refractive index than a refractive index of the clad glass body and an outer layer which has the same refractive index as the clad glass body and coats an outer periphery of the high refractive index potion; a heating step of heating the intermediate base material in which the bilayer glass rods are inserted in the holes and integrating the intermediate base material and the bilayer glass rods to obtain a photonic band gap fiber base material; and a drawing step of drawing the photonic band gap fiber base material.

According to the method of manufacturing the photonic band gap fiber, the core glass body and clad glass body are continuously formed, so that it is possible to prevent the surface of the core glass body from being damaged or an impurity from adhering to the surface. Consequently, it is possible to manufacture a photonic band gap fiber which suppresses damages or an impurity in interfaces between the core and clad.

Further, with the above method of manufacturing the photonic band gap fiber, a shape of a periphery of the holes is preferably circular in a vertical cross section of the intermediate base material in a length direction.

In addition, with the above method of manufacturing the photonic band gap fiber, a shape of a periphery of the holes is preferably regular hexagonal in a vertical cross section of the intermediate base material in a length direction.

In addition, with the above method of manufacturing the photonic band gap fiber, a shape of a periphery of the holes in a vertical cross section of the intermediate base material in a length direction preferably has an outer periphery of two partially overlapping circles having the same diameter.

Further, with the above method of manufacturing the photonic band gap fiber, in the insertion step, a glass rod which has a cross sectional shape from which part of a circle having a slightly smaller diameter than the two circles is linearly cut, and which has the same refractive index as the clad glass is preferably inserted together with the bilayer glass rods.

Furthermore, with the above method of manufacturing the photonic band gap fiber, the core glass body may be doped with a rare earth element.

Still further, with the above method of manufacturing the photonic band gap fiber, the heating step and the drawing step are preferably performed simultaneously.

By this means, it is possible to prevent a photonic band gap fiber base material from being cracked due to the thermal stress of the high refractive index portions.

Effect of the Invention

The present invention provides a method of manufacturing a photonic band gap fiber base material which can manufacture a photonic band gap fiber which can suppress transmission loss of light, and a method of manufacturing a photonic band gap fiber.

BEST MODE FOR CARRYING OUT THE INVENTION

Hereinafter, a preferred embodiment of a method of manufacturing a photonic band gap fiber base material and a method of manufacturing a photonic band gap fiber according to the present invention will be described in detail with reference to the drawings.

First Embodiment

Figure 1:
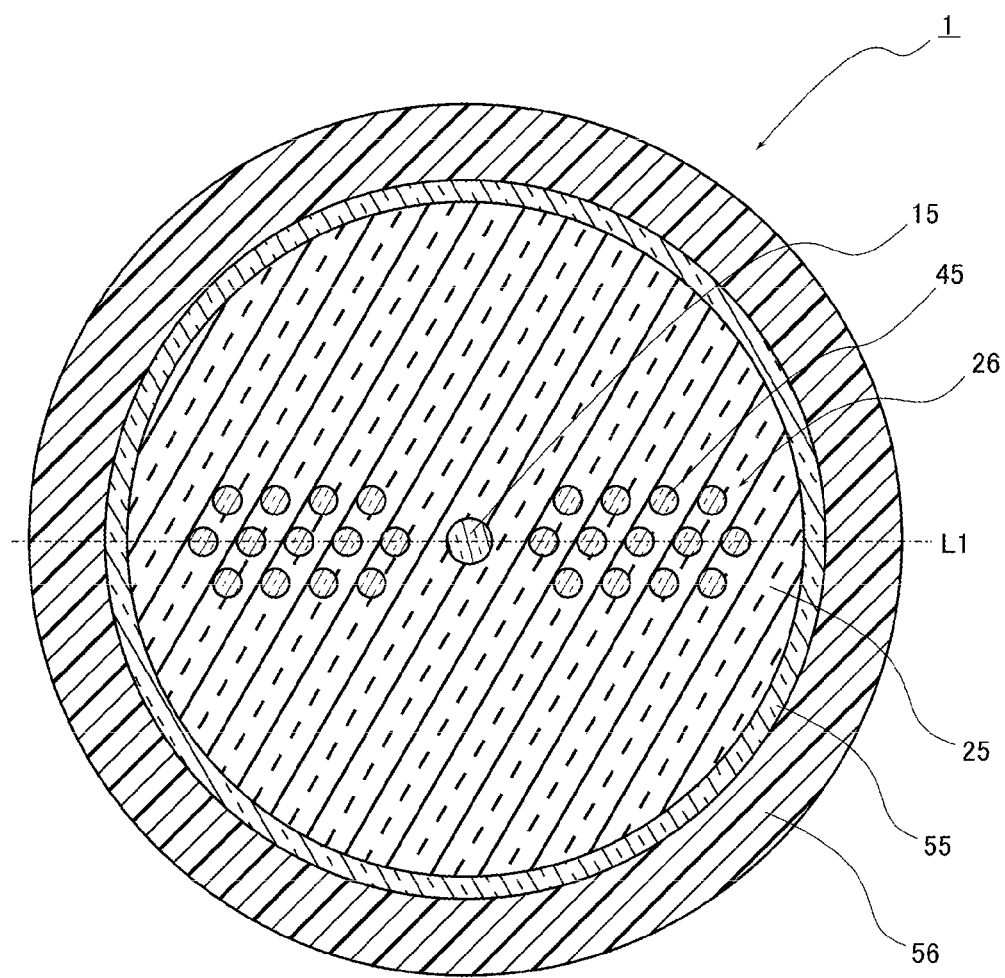
FIG. 1 is a sectional view illustrating a structure in a vertical cross section of a photonic band gap fiber in a length direction according to a first embodiment of the present invention.

FIG. 1 is a sectional view illustrating a structure in a vertical cross section of the photonic bang gap fiber (PBGF) in a length direction according to a first embodiment of the present invention.

As illustrated in FIG. 1, a PBGF 1 has a core 15 of a circular sectional shape, periodic structure areas 26 in which a plurality of high refractive index portions 45 are formed, a clad 25 which coats the outer periphery of the core 15, a resin clad 55 which coats the outer periphery of the clad 25 and a protective layer 56 which coats the outer periphery of the resin clad 55.

A plurality of high refractive index portions 45 are aligned in one line such that, in the cross section of the PBGF 1, part of the high refractive index portions 45 overlap one line L1 extending in a radial direction passing the center of the PBGF 1. Further, the other high refractive index portions 45 are aligned in a triangular grid pattern such that the distances between adjacent high refractive index portions 45 are equal. Thus, the periodic structure areas 26 are formed. The periodic structure areas 26 are formed on both sides of the core 15 in the radial direction of the PBGF 1. In addition, in the present embodiment, the number of high refractive index portions 45 aligned to overlap the line L1 is greater than the number of other high refractive index portions 45 aligned in one line.

With the PBGF 1, the refractive index in a portion of the clad 25 other than the high refractive index portions 45 is lower than the refractive index of the core 15, and the refractive index of the resin clad 55 is significantly lower than the refractive index in a portion of the clad 25 other than the refractive index of the high refractive index portions 45. Further, the refractive index of the high refractive index portions 45 is higher than the refractive index in a portion of the clad 25 other than the high refractive index portions 45. Furthermore, the refractive index of the high refractive index portions 45 is preferably higher than the refractive index of the core 15. In addition, the refractive index of the high refractive index portions 45 is higher, so that, even when the number of the high refractive index portions 45 is less, light at a wavelength band which transmits through the core 15 is intensively confined in the core 15 and, consequently, it is possible to minimize transmission loss of the core 15. Further, by configuring a high refractive index of the high refractive index portions 45, it is possible to reduce the number of high refractive index portions 45 to confine the same light.

Furthermore, although the size of each configuration forming the FBGF 1 is adequately selected for its use and is not particularly limited, for example, the diameter of the core 15 is 10 μm to 20 μm, the outer diameter of the clad 25 is 100 μm to 400 μm, the outer diameter of the resin clad 55 is 120 μm to 440 μm and the outer diameter of the protective layer 56 is 250 μm to 550 μm. Still further, for example, the diameter of the high refractive index portions 45 is 2.0 μm to 8.5 μm, and the distance between the centers of the adjacent high refractive index portions 45 is 4 μm to 10 μm. Moreover, for example, the distance between the centers between the high refractive index portion 45 closest to the core 15 and core 15 is 4 μm to 20 μm.

Further, examples of a material which is used for the core 15 include, for example, silica with which the rare earth element is doped, silica with which the rare earth element and another element are codoped and silica with which one or more types of dopants other than the rare earth element is doped. Examples of the rare earth element include, for example, ytterbium (Yb), erbium (Er) and neodymium (Nd), and examples of the dopant other than the rare earth element include, for example, germanium oxide ($GeO_2$) and aluminum oxide ($Al_2O_3$). Further, examples of the material which is used for the portion of the clad 25 other than the high refractive index portions 45 include, for example, silica with which no dopant is doped and silica with which a dopant such as fluorine (F) which decreases the refractive index is doped. Furthermore, examples of the material which is used for the high refractive index portions 45 include, for example, silica with which a dopant such as $GeO_2$ which increases the refractive index is doped. Still further, examples of the material which is used for the resin clad 55 include, for example, UV curable resin such as fluorinated acrylate having the refractive index of 1.38. Still further, examples of the material which is used for the protective layer 56 include UV curable resin such as acrylate having the refractive index of 1.5.

With the PBGF 1, a pair of periodic structure areas 26 are formed to sandwich the core 15, so that the high refractive index portions 45 function as stress applying portions and can be used as polarization maintaining optical fibers. Further, the PBGF 1 has a photonic band gap formed by the periodic structure areas 26, has wavelength bands transmission of which is restricted and wavelength bands transmission of which is allowed by a plurality of high refractive index portions 45, and can be used as a wavelength selection filter. Furthermore, when a rare earth element is doped as a dopant of the core 15, the PBGF 1 can be used as an amplifying optical fiber and, in this case, the PBGF 1 has a function of the above wavelength selection filter, so that the PBGF 1 can confine light which needs to be amplified in the core 15 and selectively allow propagation of light, and can remove light which needs not to be amplified, from the core 15 and can be used as an efficient amplifying optical fiber.

Next, the method of manufacturing the PBGF 1 illustrated in FIG. 1 will be described.

Figure 2:
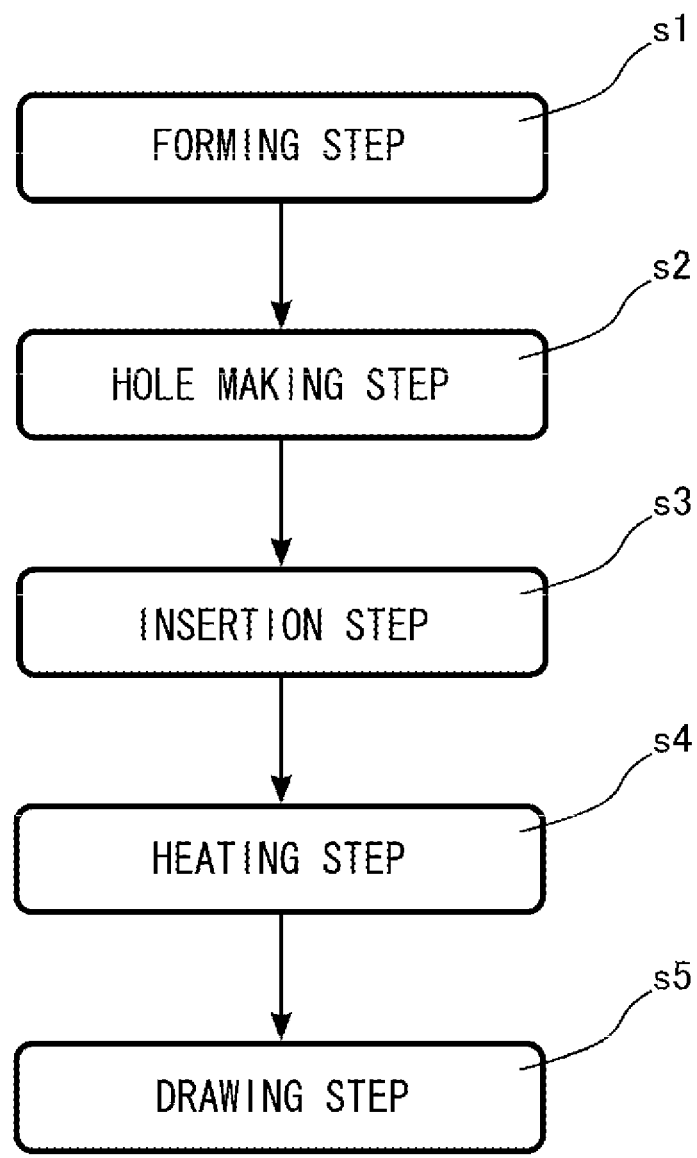
FIG. 2 is a view illustrating a process flowchart of a method of manufacturing a photonic band gap fiber illustrated in FIG. 1.

FIG. 2 is a view illustrating a process flowchart of the method of manufacturing the PBGF 1 illustrated in FIG. 1. As illustrated in FIG. 2, the method of manufacturing the PBGF 1 includes: forming step s1 of continuously forming a columnar core glass body which becomes the core 15 and a glad glass body which becomes the clad 25 and coats an outer periphery of the core glass body to obtain an intermediate base material; hole making step s2 of making holes in the clad glass body along the longitudinal direction of the core glass body; insertion step s3 of inserting in the holes a plurality of bilayer glass rods which have columnar high refractive index portions having the refractive index higher than the refractive index of the clad glass body and have outer layers which have the same refractive index as the clad glass body and coat the outer peripheries of the high refractive index portions; heating step s4 of heating the intermediate base material in which the bilayer glass rods are inserted in the holes and integrating the intermediate base material and bilayer glass rods to obtain a photonic band gap fiber base material (PBGF base material); and drawing step s5 of drawing the PBGF base material.

(Forming Step s1)

Figure 3:
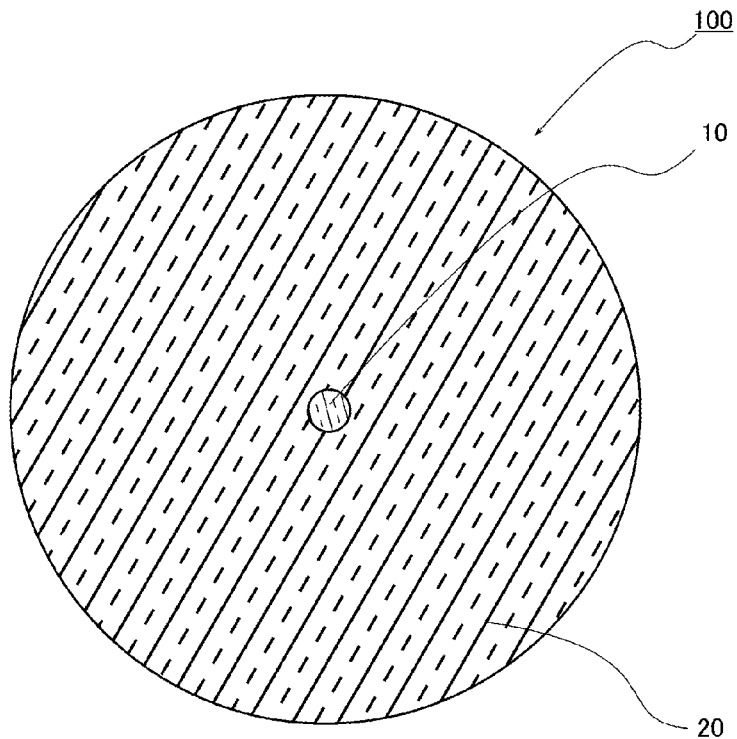
FIG. 3 is a sectional view illustrating a structure in a vertical cross section of an intermediate base member in the length direction after forming step illustrated in FIG. 2.

FIG. 3 is a sectional view illustrating a structure in the vertical cross section of the intermediate base material 100 in the length direction after forming step s1 illustrated in FIG. 2. As illustrated in FIG. 3, the intermediate base material 100 formed in forming step s1 has the core glass body 10 which becomes the core 15 of the PBGF 1 in the center, and the clad glass body 20 which coats the core glass body 10 and becomes the clad 25 of the PBGF 1.

If forming step s1 is not particularly limited as long as forming step s1 is a method of continuously forming the core glass body 10 which becomes the core 15 and clad glass body 20 which becomes the clad 25 and coats the core glass body, the method of using soot process such as a MCVD method, VAD method and OVD method is preferable because a solution impregnation method can be used when a rare earth is added.

When the intermediate base material is formed using the MCVD method, the clad glass body 20 is first formed, and the core glass body 10 is formed subsequently to formation of the clad glass body.

The clad glass body is formed by introducing vaporized silicon chloride ($SiCl_4$) in a heated silica glass tube by means of oxygen gas of a controlled flow rate ($O_2$ gas), and changing $SiCl_4$ to silicon oxide (silica: $SiO_2$) by means of heat inside the silica glass tube. In this case, when the clad 25 of the PBGF 1 is made of silica with which no dopant is doped, the clad glass body 20 is formed without particularly adding a dopant. Further, when the clad 25 of the PBGF 1 is made of silica with which a dopant such as F is doped, vaporized $SiCl_4$ and gas containing a dopant is introduced in a silica tube. When, for example, the dopant is F, the vaporized $SiCl_4$ and vaporized silicon tetrafluoride ($SiF_4$) are introduced in the interior of the silica tube. Further, by means of heat inside the silica glass tube, a transparent glass body is obtained. Thus, the clad glass body 20 is obtained.

Next, the core glass body 10 is formed. When a material which is a dopant to be doped with the core glass body 10 can be vaporized like, for example, $GeO_2$, vaporized $SiCl_4$ and gas of the vaporized dopant are introduced by means of $O_2$ gas. When, for example, a dopant is $GeO_2$, vaporized $SiCl_4$ and vaporized $GeCl_4$ are introduced in the interior of the silica tube in which the clad glass body 20 is formed. Thus, $SiCl_4$ is changed to $SiO_2$ and $GeCl_4$ is changed to $GeO_2$ to form the core glass body 10 of a high refractive index. Further, a material which is a dopant to be doped with the core glass body cannot be vaporized like part of rare earth elements, a dopant such as a rare earth element is introduced by, for example, a solution impregnation method. That is, after the clad glass body 20 is formed, a porous glass layer of silica glass is deposited inside the glad glass, and a solution in which chloride of a dopant such as a rare earth element is dissolved is impregnated in the porous glass layer. Then, the solution is discharged, and the porous glass layer is dried and is made transparent to obtain the core glass body 10.

Thus, the intermediate base material 100 is obtained.

When the intermediate base material is formed using the OVD method, the core glass body 10 is formed and the clad glass body 20 is formed subsequently to formation of the core glass body 10.

When a material which is a dopant to be doped with the core glass body 10 can be vaporized, the core glass body 10 is formed by introducing vaporized $SiCl_4$ and a material of the vaporized dopant, in fire of an oxyhydrogen burner by means of argon gas (Ar gas) of the controlled flow rate. Further, $SiCl_4$ is changed to $SiO_2$, and soot including $SiO_2$ and fine particles of the dopant is deposited on the outer peripheral surface of a mandrel which is not illustrated. When, for example, a dopant is $GeO_2$, vaporized $SiCl_4$ and $GeCl_4$ are introduced into fire of the oxyhydrogen burner. Further, $SiCl_4$ is changed to $SiO_2$ and $GeCl_4$ is changed to $GeO_2$, and soot including fine particles of $SiO_2$ and $GeO_2$ is deposited. Then, the mandrel is removed and the accumulated soot is heated to obtain a transparent glass body and fill the hole from which the mandrel is removed. Thus, the core glass body 10 is obtained. By contrast with this, when a material which is a dopant to be doped with the core glass body 10 cannot be vaporized like part of rare earth elements, vaporized $SiCl_4$ is introduced in fire of oxyhydrogen gas and soot of $SiO_2$ is deposited on the outer periphery of the mandrel to obtain a porous glass layer. A solution in which chloride of a dopant such as a rare earth element is dissolved is impregnated in the porous glass layer, and the mandrel is removed. Then, the solution is discharged, the porous glass layer is dried and is made transparent and the hole of the mandrel is filled to obtain the core glass body 10.

Next, the clad glass body 20 is formed. The clad glass body is formed by introducing vaporized $SiCl_4$ into fire of the oxyhydrogen burner by means of Ar gas of the controlled flow rate to change $SiCl_4$ to $SiO_2$ and coat the outer periphery of the core glass body 10 in which soot of the $SiO_2$ glass is formed. Then, the soot is made transparent to obtain the clad glass body 20. In this case, when the clad 25 of the PBGF 1 is made of silica with which no dopant is doped, the clad glass body 20 is formed without particularly adding a dopant. Further, when the clad 25 of the PBGF 1 is made of silica to which a dopant such as F is doped, vaporized $SiCl_4$ and gas containing a dopant are introduced in fire of the oxyhydrogen burner. When, for example, a dopant is F, vaporized $SiCl_4$ and vaporized $SiF_4$ are introduced into fire of the oxyhydrogen burner.

Thus, the intermediate base material 100 is obtained.

When the intermediate base material is formed using the VAD method, the core glass body 10 is formed and the clad glass body 20 is formed subsequently to formation of the core glass body 10.

When a material which is a dopant to be doped with the core glass body 10 can be vaporized, the core glass body 10 is formed by introducing vaporized $SiCl_4$ and a material which is the vaporized dopant in fire of an oxyhydrogen burner by means of Ar gas of the controlled flow rate. Further, $SiCl_4$ is changed to $SiO_2$, and soot including $SiO_2$ and fine particles of the dopant is deposited at the front end of a starting material which is not illustrated. When, for example, a dopant is $GeO_2$, vaporized $SiCl_4$ and $GeCl_4$ are introduced into fire of the oxyhydrogen burner. Further, $SiCl_4$ is changed to $SiO_2$ and $GeCl_4$ is changed to $GeO_2$, and soot including fine particles of $SiO_2$ and $GeO_2$ is deposited. Then, the deposited soot is heated to obtain a transparent glass body. Thus, the core glass body 10 is obtained. By contrast with this, when a material which is a dopant to be doped with the core glass body 10 cannot be vaporized like part of rare earth elements, vaporized $SiCl_4$ is introduced in fire of oxyhydrogen gas and soot of $SiO_2$ is deposited at the front end of the starting material to obtain a porous glass layer. A solution in which chloride of a dopant such as a rare earth element is dissolved is impregnated in the porous glass layer, and, then, the solution is discharged and the porous glass layer is dried and is made transparent to obtain the core glass body 10.

Next, the clad glass body 20 is formed according to the same method as the OVD method.

In addition, when a dopant to be doped with the core glass body 10 can be vaporized, forming step s1 may be performed as follows. First, an oxyhydrogen burner for manufacturing a core glass body and an oxyhydrogen burner for manufacturing a clad glass body are prepared. Further, vaporized $SiCl_4$ and a material which a vaporized dopant to be doped with the core glass body 10 are introduced in fire of the oxyhydrogen burner for manufacturing the core glass body. Further, at the same time, vaporized $SiCl_4$ is introduced into fire of the oxyhydrogen burner for manufacturing the glass body to change $SiCl_4$ to $SiO_2$. By this means, while soot which forms the core glass body 10 is formed at the front end of the starting material (not illustrated), soot which forms the clad glass body 20 is simultaneously formed to coat the soot which forms the core glass body 10. Then, the soot is made transparent to obtain the core glass body 10 and clad glass body 20. In this case, when the clad 25 of the PBGF 1 is made of silica with which no dopant is doped, the clad glass body 20 is formed without particularly adding a dopant. Further, when the clad 25 of the PBGF 1 is made of silica with which a dopant such as F is doped, vaporized $SiCl_4$ and gas containing a dopant are introduced in fire of the oxyhydrogen burner for manufacturing the clad glass body.

Thus, the intermediate base material 100 is obtained.

By continuously forming the core glass body 10 and clad glass body 20 in this way, the intermediate base material 100 is formed which has a rod shape and in which the outer periphery of the core glass body 10 illustrated in FIG. 3 is coated by the clad glass body 20.

(Hole Making Step s2)

Figure 4:
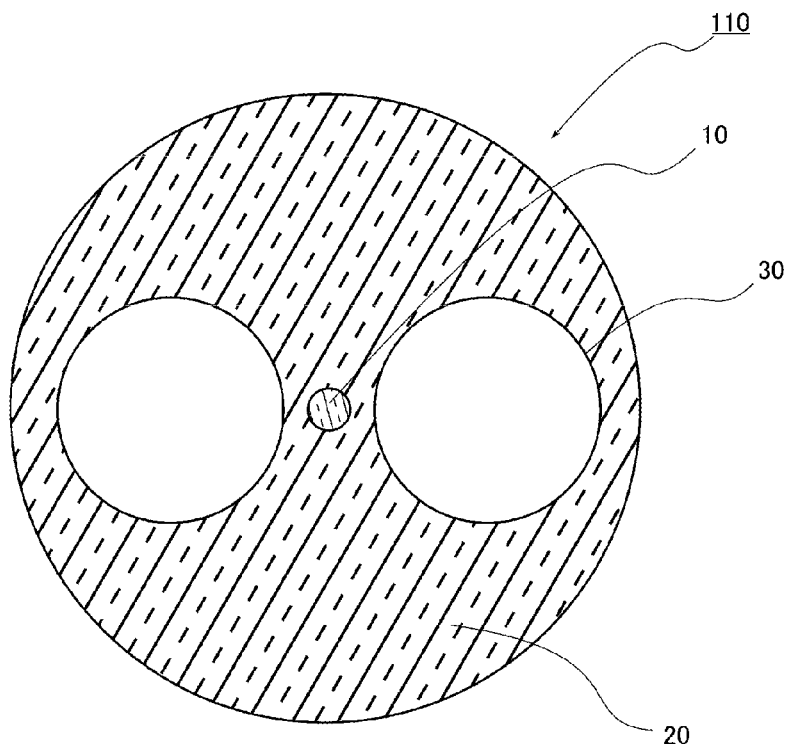
FIG. 4 is a sectional view illustrating a structure in the vertical cross section of the intermediate base material in the length direction after hole making step illustrated in FIG. 2.

After the intermediate base material 100 is formed according to forming step s1, hole making step s2 is performed. FIG. 4 is a sectional view illustrating a structure in the vertical cross section of the intermediate base material 100 in the length direction after hole making step s2 illustrated in FIG. 2.

In hole making step s2, a pair of holes 30 are formed in the clad glass body 20 of the intermediate base material 100 illustrated in FIG. 3 along the length direction of the core glass body 10 to obtain an intermediate base material 110 as illustrated in FIG. 4. The holes 30 are formed such that the shapes of the peripheries of the holes 30 are circular in the vertical cross section of the intermediate base material 110 in the length direction as illustrated in FIG. 4. That is, the inner walls of the holes 30 in the intermediate base material 110 have a cylindrical shape. Further, a pair of holes 30 are formed in positions at which the holes 30 are symmetrical from each other with respect to the center of the intermediate base material 100.

A pair of the holes 30 are formed by mechanical means such as a drill. In this case, the holes 30 prevent the core glass body 10 from being exposed inside the holes 30.

In addition, after the holes 30 are formed, preferably, the inner wall of the clad glass body 20 is polished and convexities and concavities of the inner wall are removed to suppress air bubbles or distortion in the PBGF 1.

Thus, the intermediate base material 110 illustrated in FIG. 4 in which a pair of holes 30 are formed is obtained.

(Insertion Step s3)

Next, a plurality of bilayer glass rods 40 and glass rods 22 and 23 which have the same refractive index as the clad glass body 20 are inserted in a pair of holes 30 formed in hole making step s2. The bilayer glass rod 40 has the columnar high refractive index portion 41 which has a higher refractive index than the clad glass body 20, and the outer layer 42 which coats the outer periphery of the high refractive index portion 41 and has the same refractive index as the clad glass body 20. Further, the glass rod 22 has the same diameter as the bilayer glass rod 40, and the glass rod 23 has a smaller diameter than the bilayer glass rod 40.

The bilayer glass rods are inserted by aligning in respective holes 30 a plurality of bilayer glass rods 40 in one line to overlap one line L1 extending in the radial direction passing the center of the intermediate base material 110, and aligning other bilayer glass rods 40 in a triangular grid pattern such that the distances between adjacent bilayer glass rods 40 are equal. In addition, in the present embodiment, the number of bilayer glass rods 40 aligned to overlap one line L1 extending in the radial direction passing the center of the FBGF 1 is greater than the number of other bilayer glass rods 40 aligned in one line.

Further, the glass rods 22 and 23 are inserted in spaces left after the bilayer glass rods 40 are inserted in the holes 30.

In addition, according to the order to insert the bilayer glass rods 40 and glass rods 22 and 23, the bilayer glass rods 40 and glass rods 22 and 23 may be simultaneously inserted, or one of the bilayer glass rods 40 and glass rods 22 and 23 may be inserted first.

Figure 5:
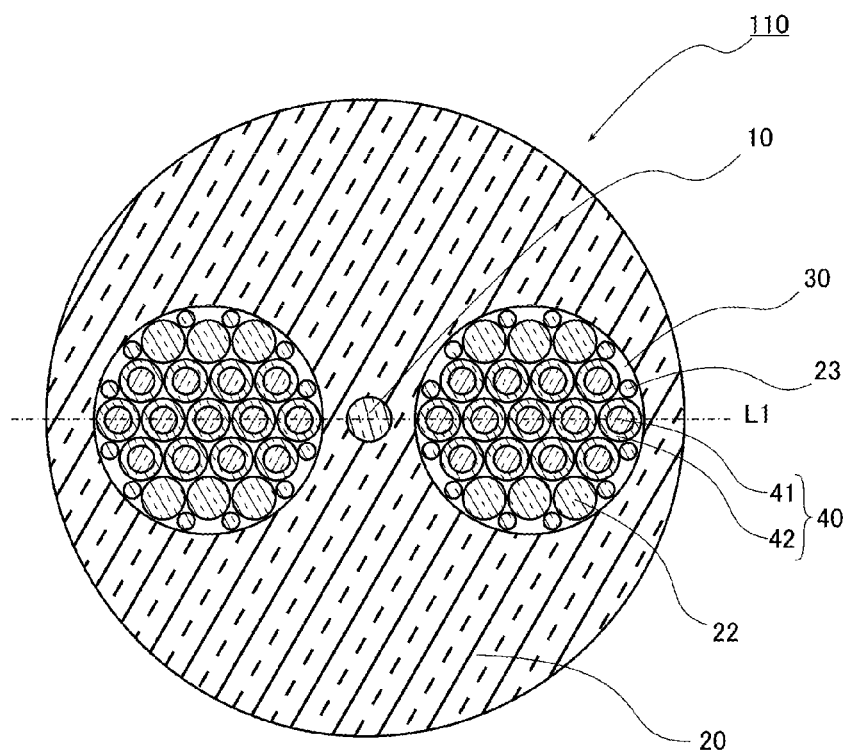
FIG. 5 is a sectional view illustrating the structure in the vertical cross section of the intermediate base material in the length direction after insertion step illustrated in FIG. 2.

Thus, the intermediate base material 110 is obtained in which a plurality of bilayer glass rods 40 and glass rods 22 and 23 illustrated in FIG. 5 are inserted in a pair of holes 30.

(Heating Step s4)

Figure 6:
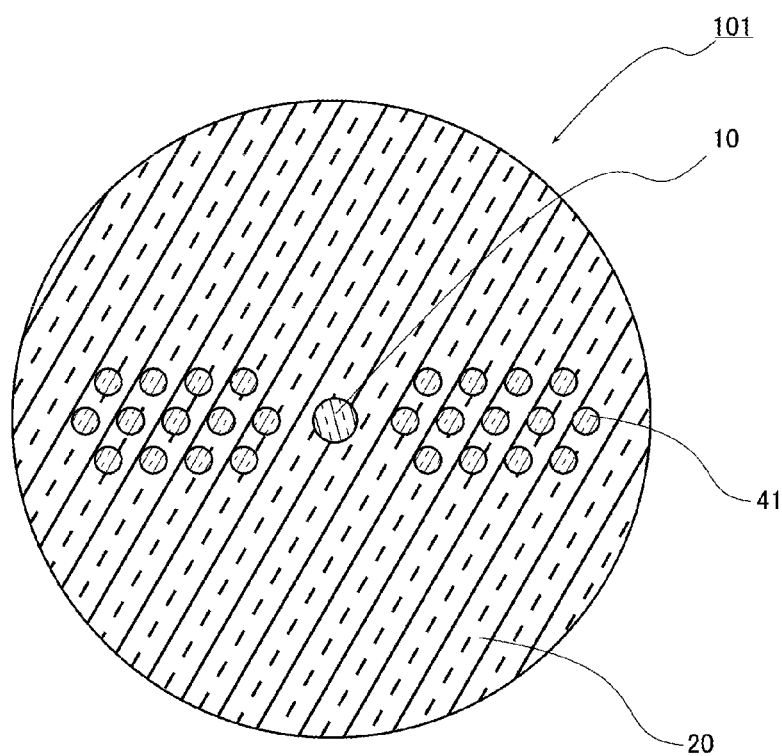
FIG. 6 is a sectional view illustrating the structure in the vertical cross section of a photonic band gap fiber base material in the length direction after heating step illustrated in FIG. 2.

Next, the intermediate base material 110 in which the bilayer glass rods 40 and glass rods 22 and 23 are inserted in a pair of holes 30 is heated and integrated. FIG. 6 is a sectional view illustrating the structure in the vertical cross section of the base material in the length direction after heating step illustrated in FIG. 2.

The intermediate base material 110 is heated in a vacuum state in a state where the bilayer glass rods 40 and glass rods 22 and 23 are inserted in a pair of holes 30. With the degree of vacuum in this case, the atmosphere in the holes 30 is preferably between 0 Pa and 93 kPa, and, further, the heating temperature is between 1800° C. and 2200° C. The gaps between the bilayer glass rods 40 and glass rods 22 and 23 in the holes 30 are filled, and the outer layers 42 of the bilayer glass rods 40 and glass rods 22 and 23 become part of the clad glass body 20.

Thus, the PBGF base material 101 illustrated in FIG. 6 obtained.

(Drawing Step s5)

Figure 7:
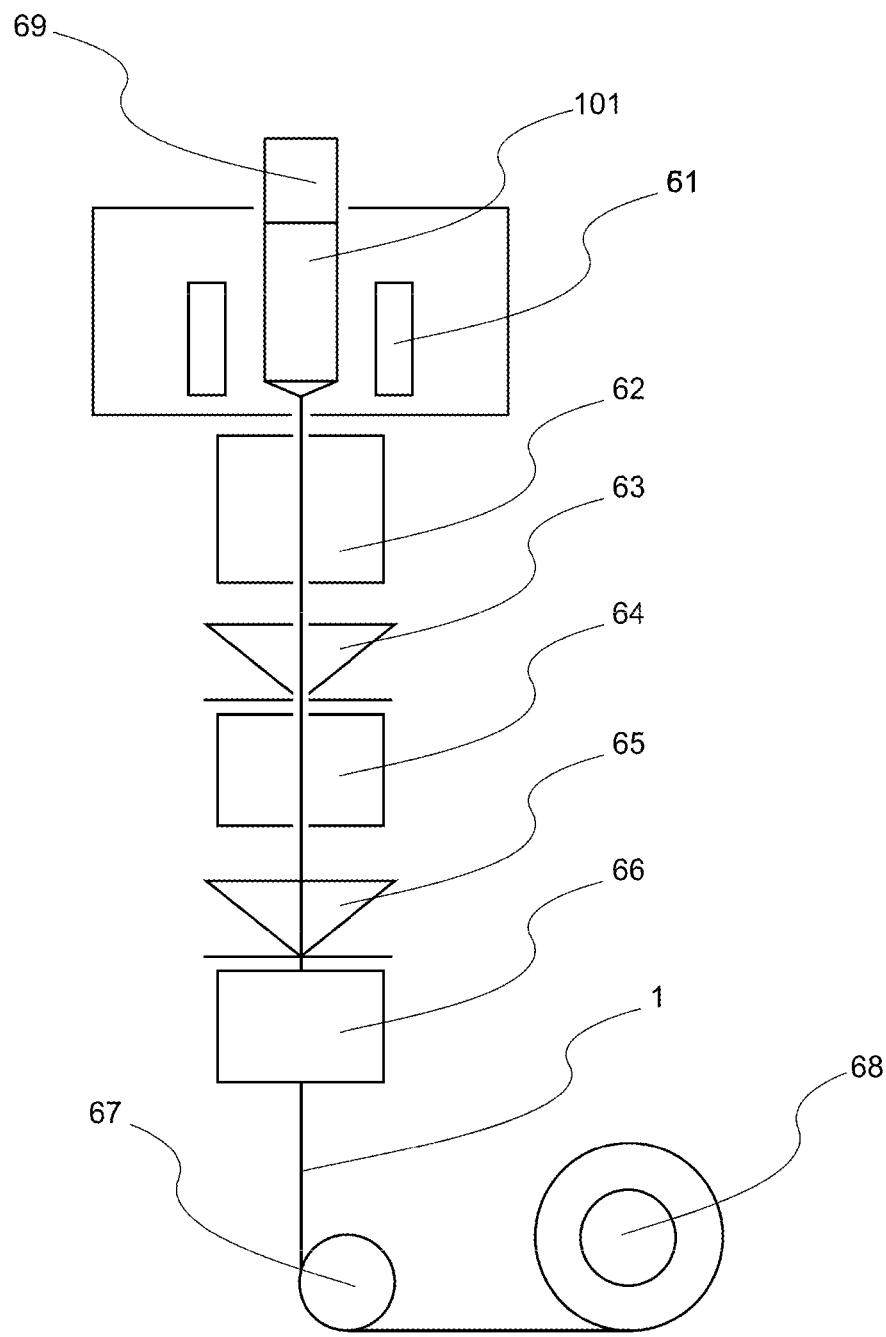
FIG. 7 is a view illustrating how drawing step illustrated in FIG. 2 is performed.

FIG. 7 is a view illustrating how drawing step illustrated in FIG. 2 is performed. As illustrated in FIG. 7, a dummy glass rod 69 is connected to the PBGF base material 101 illustrated in FIG. 6 which is manufactured according to the above-described method of manufacturing the PBGF base material, and is installed in a heating furnace 61 such as an electric furnace in a state where these vertically stand.

Further, the PBGF base material 101 is heated and melted in the heating furnace 61. The PBGF base material in this case is at 1900° C. to 2200° C. When the glass drawn from the PBGF base material 101 is drawn, the glass is solidified and a PBGF is obtained in which the resin clad 55 and protective layer 56 are not formed in FIG. 1.

Next, the PBGF in which the resin clad 55 and protective layer 56 are not formed is controlled at an adequate temperature by the cooling device 62. Further, the PBGF in which the resin clad 55 and protective layer 56 are formed passes the coating dice 63 in which a UV curable resin which becomes the resin clad layer 55 is introduced, and is further radiated with an ultraviolet ray by the ultraviolet ray radiating device 64. Thus, the resin clad 55 illustrated in FIG. 1 is formed.

Further, the PBGF in which the resin clad 55 is formed passes the coating dice 65 in which a UV curable resin which becomes the protective layer 56 is introduced, and is further radiated with an ultraviolet ray by the ultraviolet ray radiating device 66. Thus, the protective layer 56 illustrated in FIG. 1 is formed, and the PBGF 1 illustrated in FIG. 1 is obtained. Then, the PBGF 1 is wound by a bobbin 68 through a pulley 67.

With the method of manufacturing the PBGF 1 according to the present invention, when the PBGF base material 101 is manufactured, the core glass body 10 and clad glass body 20 are continuously formed, so that it is possible to prevent the surface of the core glass body 10 from being damaged and prevent an impurity from adhering to the surface. Further, by drawing the PBGF base material 101 obtained in this way, it is possible to manufacture the PBGF 1 in which a plurality of high refractive index portions 45 are formed in the clad 25 by the high refractive index portions 41 of the bilayer glass rods 40 and which suppresses damages and an impurity in the interface between the core 15 and clad 25.

Further, with the method of manufacturing the PBGF base material 101, it is possible to flexibly adjust the positions of the holes 30 made in the clad glass body 20, and flexibly adjust the positions of the high refractive index portions 41 in the PBGF 1.

Further, by making the shapes of the peripheries of the holes 30 circular in the vertical cross section of the intermediate base material 110 in the length direction, it is possible to easily form the holes 30 by means of mechanical means and easily perform hole making step s2. Further, the shapes of the peripheries of the holes 30 are circular, so that it is possible to flexibly rotate alignment of a plurality of bilayer glass rods 40 in the circumferential direction of the holes 30. Consequently, it is possible to flexibly adjust the orientation of alignment of the bilayer glass rods 40 in insertion step s3. By using the PBGF base material 101, it is possible to easily manufacture a PBGF in which a plurality of high refractive index portions 45 are aligned to overlap one line L1 extending in the radial direction passing the center in the cross section, and a PBGF in which alignment of a plurality of high refractive index portions 45 is inclined without overlapping the line extending in the radial direction passing the center in the cross section.

Second Embodiment

Figure 8:
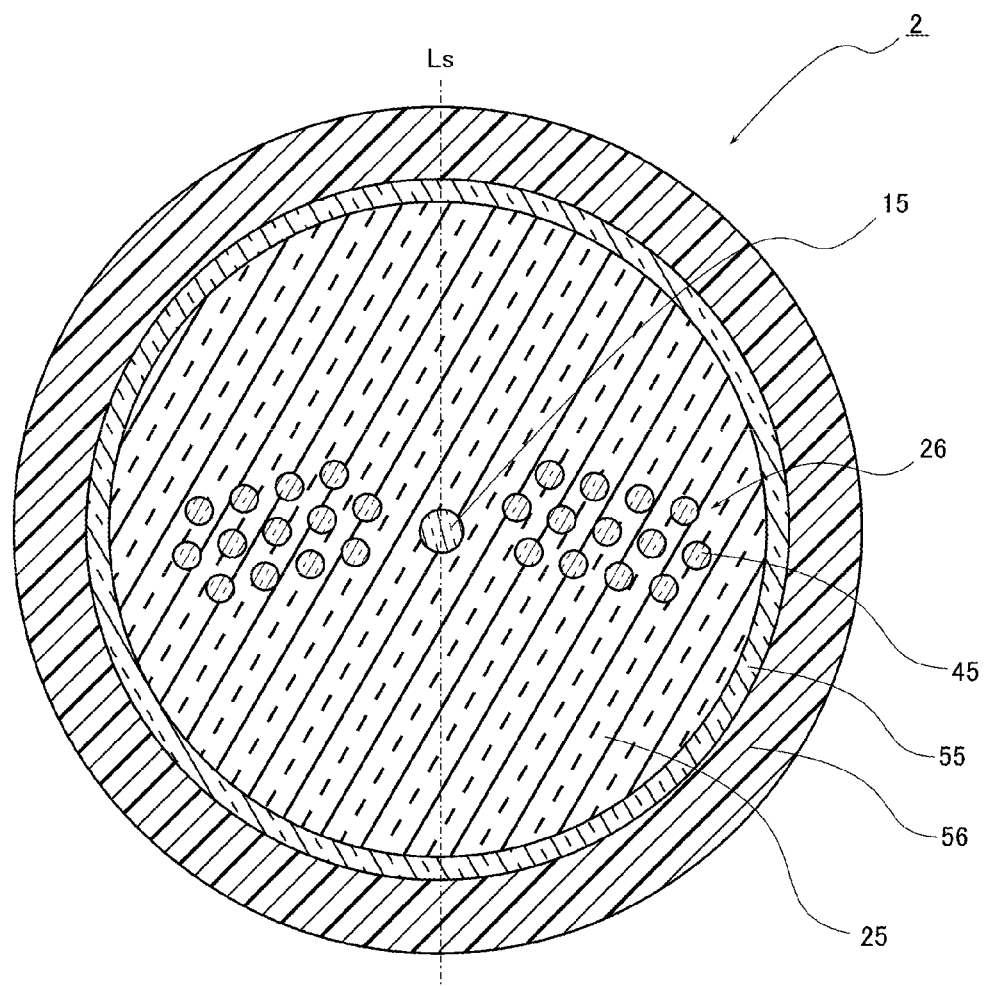
FIG. 8 is a sectional view illustrating a structure in a vertical cross section of a photonic band gap fiber in the length direction according to a second embodiment of the present invention.

Next, a second embodiment of the present invention will be described in detail with reference to FIGS. 8 to 10. Here, components that are identical or similar to those in the first embodiment are indicated by the same reference numerals and the same explanation will not be repeated. FIG. 8 is a sectional view illustrating a structure in a vertical cross section of a PBGF in a length direction according to the present embodiment, FIG. 9 is a view illustrating the structure in the vertical cross section of an intermediate base material in the length direction after insertion step according to the present embodiment, and FIG. 10 is a sectional view illustrating the structure in the vertical cross section of a PBGF base material manufactured according to the present embodiment, in the length direction.

As illustrated in FIG. 8, a PBGF 2 according to the present embodiment differs from the PBGF 1 according to the first embodiment in that, in the vertical cross section of the PBGF 2 in the length direction, alignment of a plurality of high refractive index portions 45 is configured to pass the center of the PBGF 2 without overlapping a line extending in the radial direction of the PBGF 2. Further, in the present embodiment, alignment of the high refractive index portions 41 on one side of the periodic structure area 26 and alignment of the high refractive index portions 41 on the other side of the periodic structure area 26 are symmetrical with respect to one line Ls passing the center of the PBGF 2. With the PBGF 2 employing this configuration, when a plurality of PBGFs 2 are connected, even if the end of any side of the PBGFs 2 is connected, it is possible to align the high refractive index portions 41 of the PBGF 2 of a connection source and PBGF 2 of a connection target.

With the method of manufacturing the PBGF 2, forming step s1 and hole making step s2 are performed in the same way as forming step s1 and hole making step s2 according to the first embodiment to obtain the intermediate base material 110 illustrated in FIG. 4.

Figure 9:
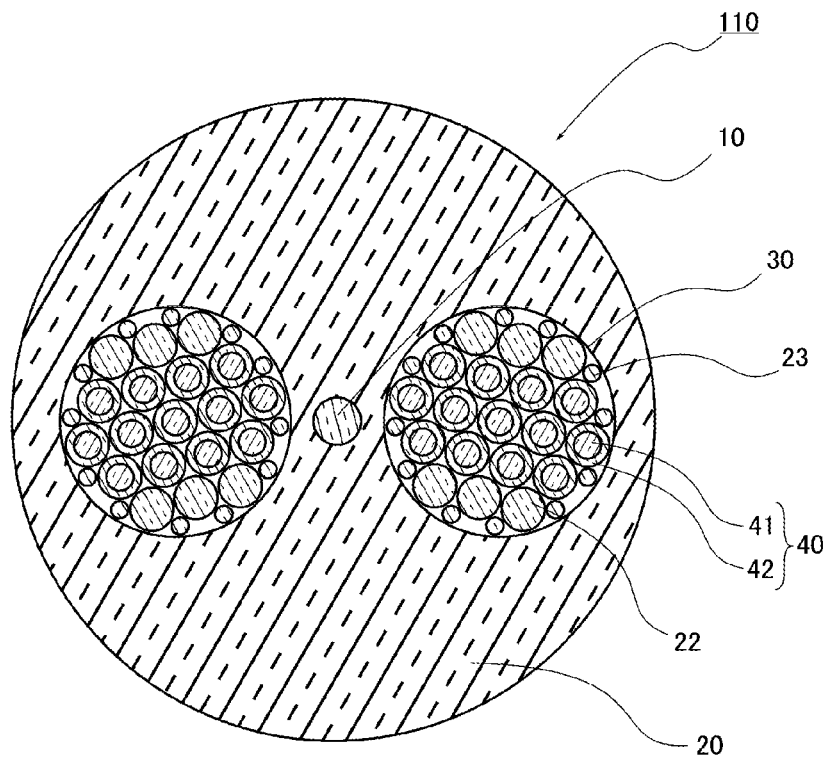
FIG. 9 is a view illustrating the structure in the vertical cross section of an intermediate base material in the length direction after insertion step according to the second embodiment of the present invention.
Figure 10:
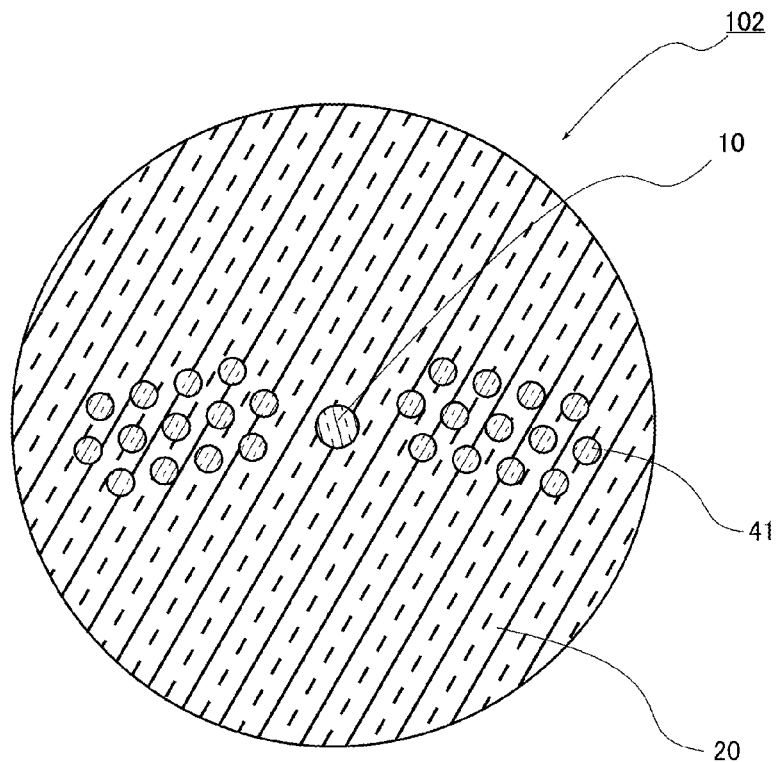
FIG. 10 is a sectional view illustrating the structure in the vertical cross section of a photonic band gap fiber base material to be manufactured, in the length direction according to the second embodiment of the present invention.

Next, as illustrated in FIG. 9, in insertion step s3 according to the present embodiment, bilayer glass rods 40 are inserted such that alignment of the bilayer glass rods 40 does not overlap a line extending in the radial direction of the intermediate base material 110 passing the center of the intermediate base material 110. The insertion step s3 differs from insertion step s3 according to the first embodiment in this regard. Further, in the present embodiment, a plurality of bilayer glass rods 40 are inserted such that alignment of bilayer glass rods 40 to be inserted in one hole 30 and alignment of bilayer glass rods 40 to be inserted in the other hole 30 are symmetrical with respect to the line which is vertical to a line passing the center of the two holes 30 and passes the center of the intermediate base material 110.

Next, similar to heating step s4 according to the first embodiment, the intermediate base material 110 in which, for example, the bilayer glass rods 40 are inserted is heated to obtain a PBGF base material 102 illustrated in FIG. 10.

Then, similar to the first embodiment illustrated in FIG. 7, drawing step s5 is performed to obtain the PBGF 2 illustrated in FIG. 8.

Third Embodiment

Figure 11:
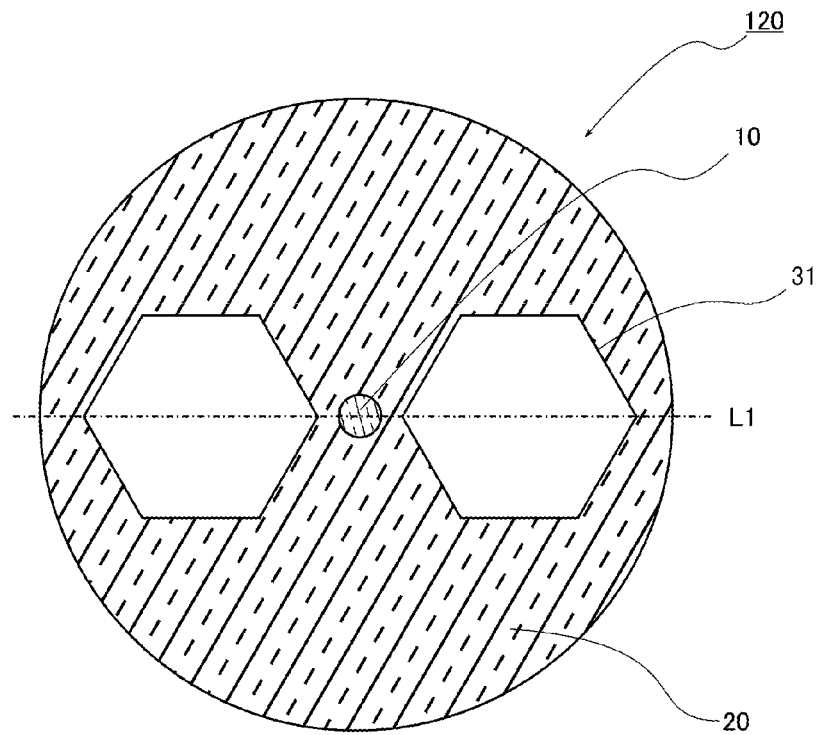
FIG. 11 is a sectional view illustrating a structure in a vertical cross section of an intermediate base material in a length direction after hole making step according to a third embodiment of the present invention.

Next, a third embodiment of the present invention will be described in detail with reference to FIGS. 11 and 12. Here, components that are identical or similar to those in the first embodiment are indicated by the same reference numerals and the same explanation will not be repeated. The present embodiment is directed to another manufacturing method of manufacturing the same PBGF 1 as the first embodiment illustrated in FIG. 1. FIG. 11 is a sectional view illustrating a structure in the vertical cross section of an intermediate base material in the length direction after hole making step according to the present embodiment, and FIG. 12 is a sectional view illustrating the structure in the vertical cross section of the intermediate base material in the length direction after insertion step according to the present embodiment.

In the present embodiment, forming step s1 is performed in the same way as forming step s1 according to the first embodiment to obtain an intermediate base material 100 illustrated in FIG. 3. Next, in hole making step s2, a pair of regular hexagonal holes 31 are formed in the intermediate base material 100 illustrated in FIG. 3 along the length direction of a core glass body 10 to obtain an intermediate base material 120 illustrated in FIG. 11. In this case, the respective holes 31 are formed such that, in the cross section of the intermediate base material 100, a line connecting a pair of apexes opposing to each other at the peripheries of the holes 31 passes the center of the intermediate base material 100 and overlaps the line L1 extending in the radial direction of the intermediate base material 100. Further, the respective holes 31 are formed symmetrical with respect to the center of the intermediate base material 100.

Figure 12:
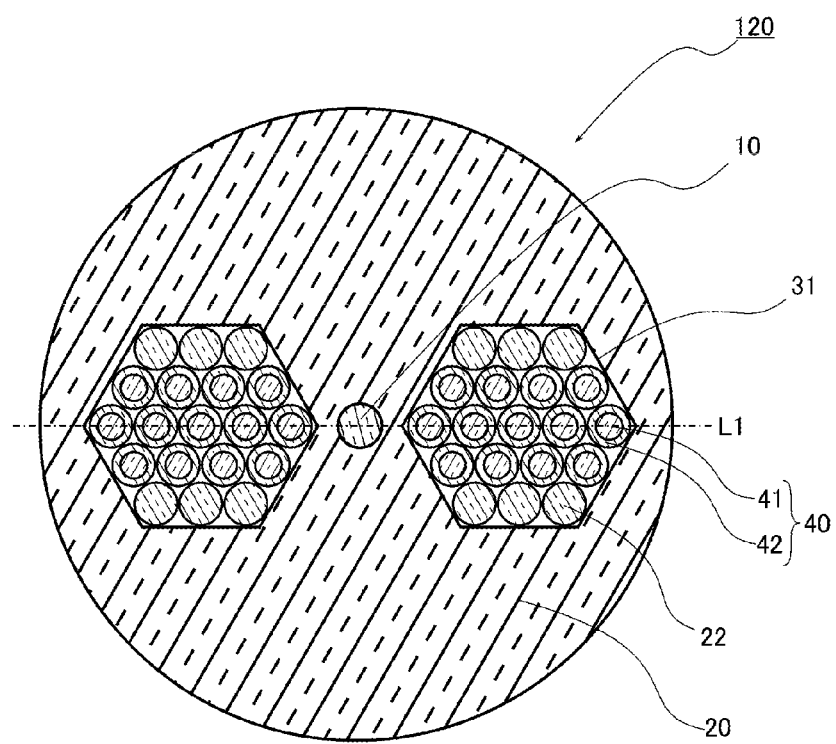
FIG. 12 is a sectional view illustrating the structure in the vertical cross section of the intermediate base material in the length direction after insertion step according to the third embodiment of the present invention.

Next, as illustrated in FIG. 12, in insertion step s3, a plurality of bilayer glass rods 40 are inserted in a pair of holes 31 formed in the intermediate base material 120. In this case, a plurality of bilayer glass rods 40 are aligned in one line to overlap a line L1 extending in the radial direction passing the center of the intermediate base material 110, and the other bilayer glass rods 40 are aligned in a triangular grid pattern such that the distances between adjacent bilayer glass rods 40 are equal.

Further, the glass rods 22 are inserted in spaces left after the bilayer glass rods 40 are inserted in the holes 31. In addition, in the present embodiment, the size of the hole 31 is set in advance such that the bilayer glass rods 40 and glass rods 22 having the same diameter as the diameter of the bilayer glass rods 40 are closely packed in the hole 31.

In addition, similar to the first embodiment, according to the order to insert the bilayer glass rods 40 and glass rods 22, the bilayer glass rods 40 and glass rods 22 may be simultaneously inserted, or one of the bilayer glass rods 40 and glass rods 22 may be inserted first.

Next, similar to heating step s4 according to the first embodiment, the intermediate base material 120 is heated in which, for example, the bilayer glass rods 40 are inserted. In the heating step s4, the gaps between the bilayer glass rods 40 and glass rods 22 in the holes 31 are filled, and the outer layers 42 of the bilayer glass rods 40 and glass rods 22 are part of the clad glass body 20.

Thus, the same PBGF base material 101 illustrated as in the first embodiment in FIG. 6 is obtained.

Then, similar to the first embodiment, drawing step s5 is performed to obtain the PBGF 1 illustrated in FIG. 1.

With the method of manufacturing the PBGF 1 according to the present embodiment, in hole making step s2, by making the shapes of the peripheries of the holes 31 regular hexagonal in the cross section of the intermediate base material 120, it is possible to closely pack the bilayer glass rods 40 and glass rods 22 having the same diameter in the holes 31 in insertion step s3. Further, the shapes of the peripheries of the holes 31 in the cross section of the intermediate base material 120 are not circular, so that alignment of a plurality of bilayer glass rods 40 is prevented from moving in a rotation direction with respect to a circumferential direction of the holes 31. Consequently, it is possible to easily fix the bilayer glass rods 40 and glass rods 22 to the holes 31.

Fourth Embodiment

Figure 13:
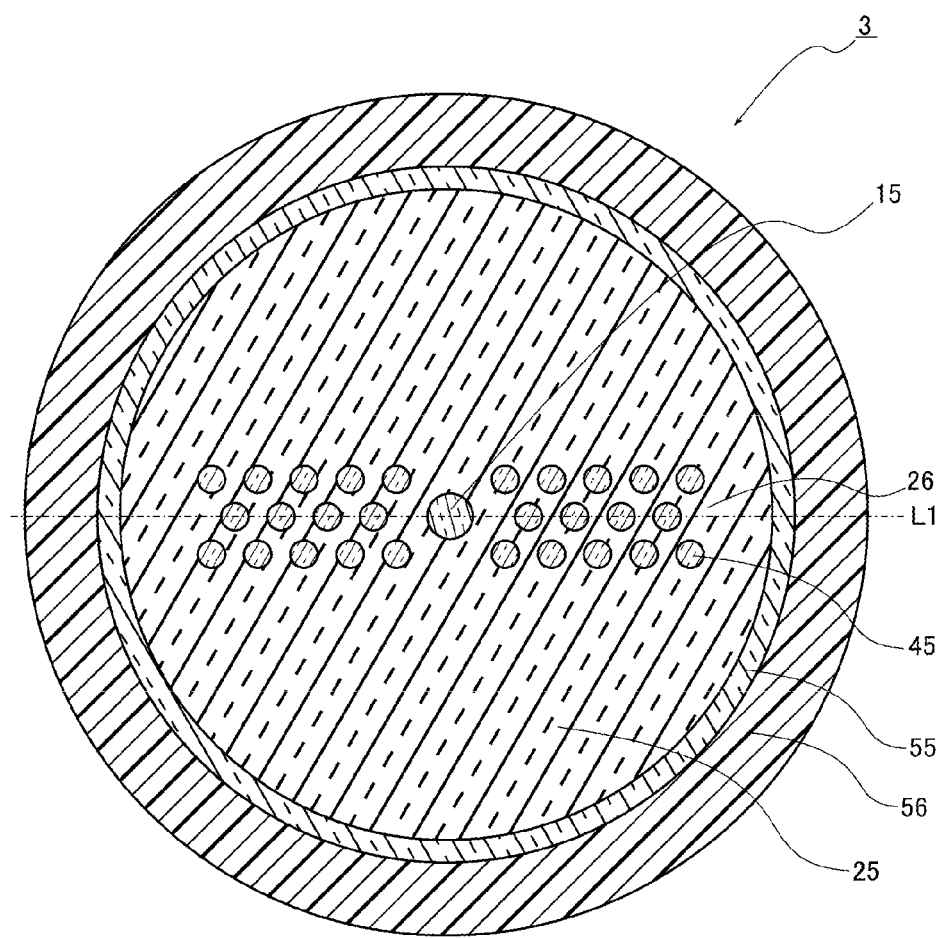
FIG. 13 is a sectional view illustrating a structure in a vertical cross section of a photonic band gap fiber in a length direction according to a fourth embodiment of the present invention.
Figure 14:
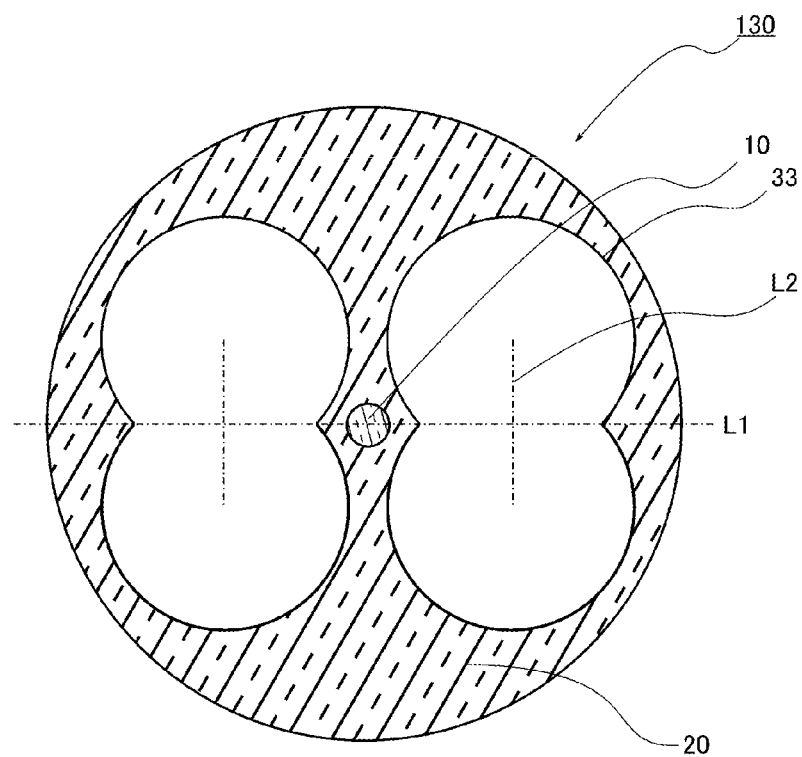
FIG. 14 is a sectional view illustrating the structure in the vertical cross section of the intermediate base material in the length direction after hole making step according to the fourth embodiment of the present invention.
Figure 15:
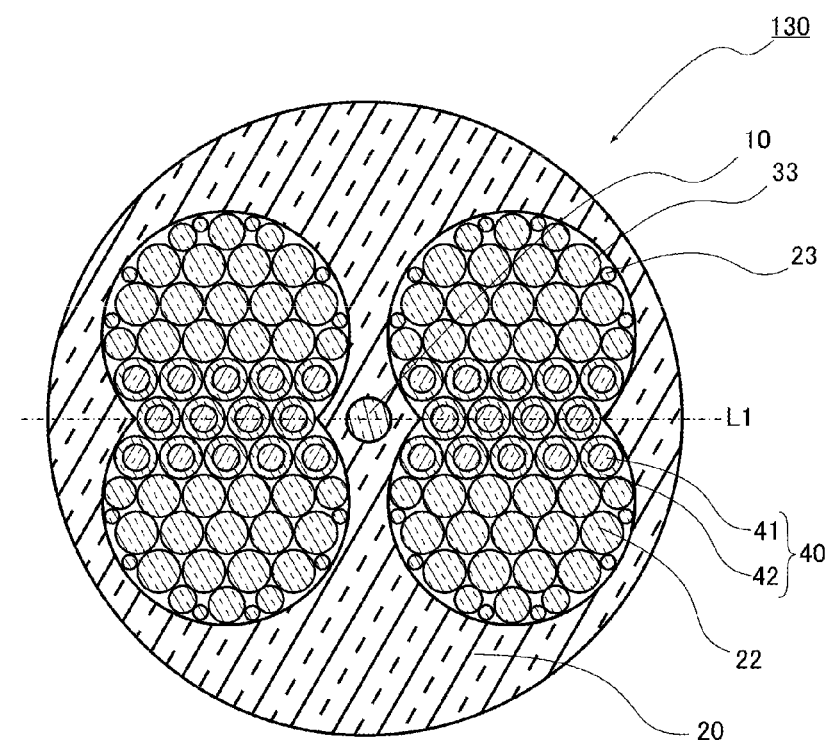
FIG. 15 is a sectional view illustrating the structure in the vertical cross section of the intermediate base material in the length direction after insertion step according to the fourth embodiment of the present invention.
Figure 16:
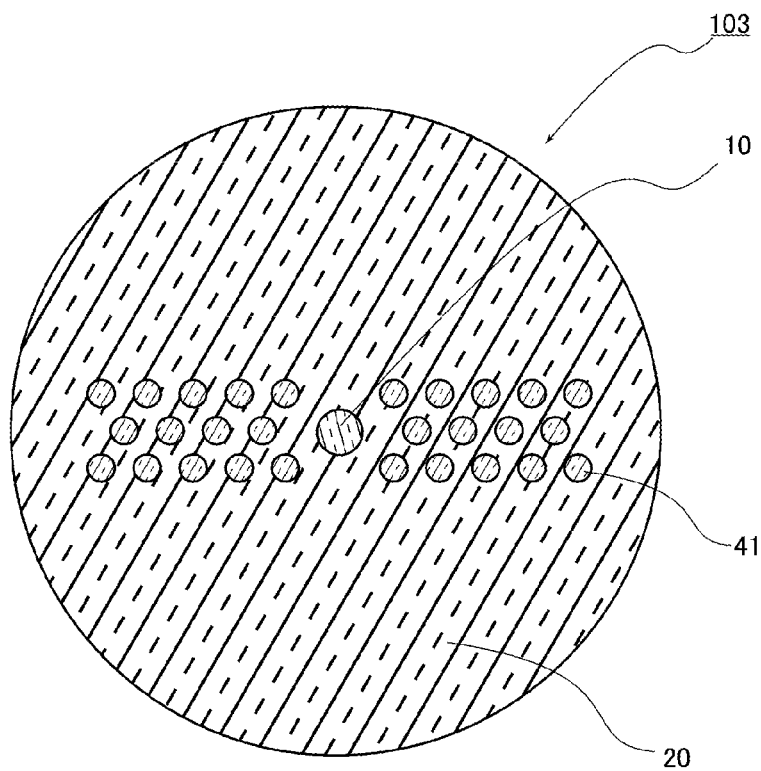
FIG. 16 is a sectional view illustrating the structure in the vertical cross section of the base material in the length direction after heating step according to the fourth embodiment of the present invention.

Next, a fourth embodiment of the present invention will be described in detail with reference to FIGS. 13 to 15. Here, components that are identical or similar to those in the first embodiment are indicated by the same reference numerals and the same explanation will not be repeated. FIG. 13 is a sectional view illustrating a structure in a vertical cross section of a PBGF in a length direction according to the fourth embodiment of the present invention, FIG. 14 is a sectional view illustrating the structure in the vertical cross section of an intermediate base material in the length direction after hole making step according to the present embodiment, FIG. 15 is a sectional view illustrating the structure in the vertical cross section of the intermediate base material in the length direction after insertion step according to the present embodiment and FIG. 16 is a sectional view illustrating the structure in the vertical cross section of the base material in the length direction after heating step according to the present embodiment.

As illustrated in FIG. 13, a PBGF 3 according to the present embodiment differs from the PBGF 1 according to the first embodiment illustrated in FIG. 1 in that the number of high refractive index portions 45 aligned to overlap one line L1 extending in the radial direction passing the center of the PBGF 3 is less than the number of other high refractive index portions 45 aligned in one line. With the PBGF 3 employing this configuration, it is possible to increase the number of high refractive index portions 45 close to the core and, consequently, increase the birefringence.

With the method of manufacturing the PBGF 3, forming step s1 is performed in the same way as forming step s1 according to the first embodiment to obtain the intermediate base material 100 illustrated in FIG. 3.

Next, in hole making step s2, a pair of holes 33 are formed along the length direction of the core glass body 10. The hole 33 has a shape having an outer periphery of two partially overlapping circles having the same diameter in the cross section of the intermediate base material 100 illustrated in FIG. 3. The hole 33 is formed by making two holes having circular peripheral shape in the cross section such that the two circles partially overlap. In this case, the holes 33 are formed such that a line L2 connecting the centers of the two partially overlapping circular holes is vertical to a line L1 extending in a radial direction passing the center of the intermediate base material 100 and the distances from the centers of two partially overlapping circular holes to the line L1 are equal. Thus, an intermediate base material 130 illustrated in FIG. 14 is obtained.

Next, in insertion step s3, the bilayer glass rods 40 and glass rods 22 and 23 are inserted in a pair of holes 33 of the intermediate base material 130. The bilayer glass rods 40 are inserted such that a plurality of bilayer glass rods 40 are aligned in one line to overlap one line L1 extending in the radial direction passing the center of the intermediate base material 100. Further, the other bilayer glass rods 40 are aligned in a triangular grid pattern such that the distances between adjacent bilayer glass rods are equal. In this case, the bilayer glass rods 40 are inserted such that the number of the bilayer glass rods 40 aligned to overlap the line L1 is less than the number of the other bilayer glass rods 40 aligned in one line.

Further, the glass rods 22 and 23 are inserted in spaces left after the bilayer glass rods 40 are inserted in the holes 30.

In addition, similar to the first embodiment, according to the order to insert the bilayer glass rods 40 and glass rods 22 and 23, the bilayer glass rods 40 and glass rods 22 and 23 may be simultaneously inserted, or one of the bilayer glass rods 40 and glass rods 22 and 23 may be inserted first.

Next, similar to heating step s4 according to the first embodiment, the intermediate base material 130 is heated in which, for example, the bilayer glass rods 40 are inserted. In the heating step s4, the gaps between the bilayer glass rods 40 and glass rods 22 and 23 in the holes 33 are filled, and the outer layers 42 of the bilayer glass rods 40 and glass rods 22 and 23 are part of the clad glass body 20.

Thus, the PBGF base material 103 illustrated in FIG. 16 is obtained.

Then, similar to the first embodiment, drawing step s5 is performed to obtain the PBGF 3 illustrated in FIG. 13.

With the method of manufacturing the PBGF 3 according to the present embodiment, two holes 33 having the periphery of the circular shape in the cross section only need to be opened to partially overlap in hole making step s2 of manufacturing the PBGF base material 103, so that it is possible to easily form the holes by means of mechanical means. Consequently, it is possible to easily perform hole making step s2. Further, the shape of the periphery of the hole in the cross section is not circular, so that, after insertion step s3, alignment of a plurality of bilayer glass rods 40 is prevented from moving in the circumferential direction of the holes 33. Consequently, it is possible to easily fix the bilayer glass rods 40 and glass rods 22 and 23 to the holes 33.

Fifth Embodiment

Figure 17:
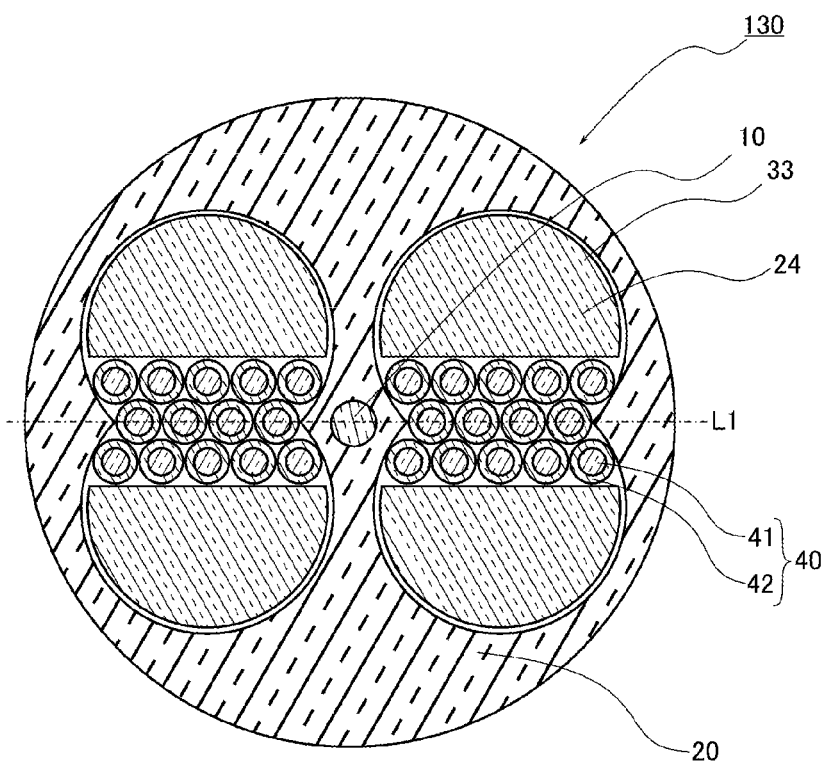
FIG. 17 is a sectional view illustrating the structure in the vertical cross section of the intermediate base material in the length direction after insertion step according to a fifth embodiment of the present invention.

Next, a fifth embodiment of the present invention will be described in detail with reference to FIG. 17. Here, components that are identical or similar to those in the fourth embodiment are indicated by the same reference numerals and the same explanation will not be repeated. The present embodiment is directed to another manufacturing method of manufacturing the same PBGF 3 as the fourth embodiment illustrated in FIG. 13. FIG. 17 is a sectional view illustrating the structure in a vertical cross section of an intermediate base material in the length direction after insertion step according to the present embodiment.

In the present embodiment, forming step s1 and hole making step s2 are performed in the same way as forming step s1 and hole making step s2 according to the fourth embodiment to obtain an intermediate base material 130 illustrated in FIG. 14. Next, in insertion step s3, a plurality of bilayer glass rods 40 are inserted in a pair of holes 33 formed in the intermediate base material 130 similar to the fourth embodiment. Further, the glass rods 24 having the same refractive index as the clad glass body 20 are inserted in spaces left after the bilayer glass rods 40 are inserted in the holes 33. With the glass rod 24, the cross section has a shape from which part of a circle having a slightly smaller diameter than two partially overlapping circles forming the holes 33 in the cross section of the intermediate base material 130 is linearly cut.

In addition, according to the order to insert the bilayer glass rods 40 and glass rods 24, the bilayer glass rods 40 and glass rods 24 may be simultaneously inserted, or one of the bilayer glass rods 40 and glass rods 24 may be inserted first.

Next, similar to heating step s4 according to the fourth embodiment, the intermediate base material 130 is heated in which, for example, the bilayer glass rods 40 are inserted. In the heating step, the gaps between the bilayer glass rods 40 and glass rods 24 in the holes 33 are filled, and the outer layers 42 of the bilayer glass rods 40 and glass rods 24 are part of the clad glass body 20.

Thus, the same PBGF base material 103 as in the fourth embodiment illustrated in FIG. 16 is obtained.

Then, similar to the first embodiment, drawing step s5 is performed to obtain the PBGF 3 illustrated in FIG. 13.

With the method of manufacturing the PBGF 3 according to the present embodiment, in insertion step s3, the glass rods 24 of the cross section having a shape from which part of a circle having a slightly smaller diameter than two partially overlapping circles forming the holes 33 in the cross section of the intermediate base material 130 is linearly cut are inserted in spaces left after the bilayer glass rods 40 are inserted in the holes 33, so that it is possible to prevent a plurality of small gaps from being made in portions other than portions of the holes 33 in which the bilayer glass rods are inserted. Consequently, it is possible to make the precise PBGF base material 103.

Sixth Embodiment

Figure 18:
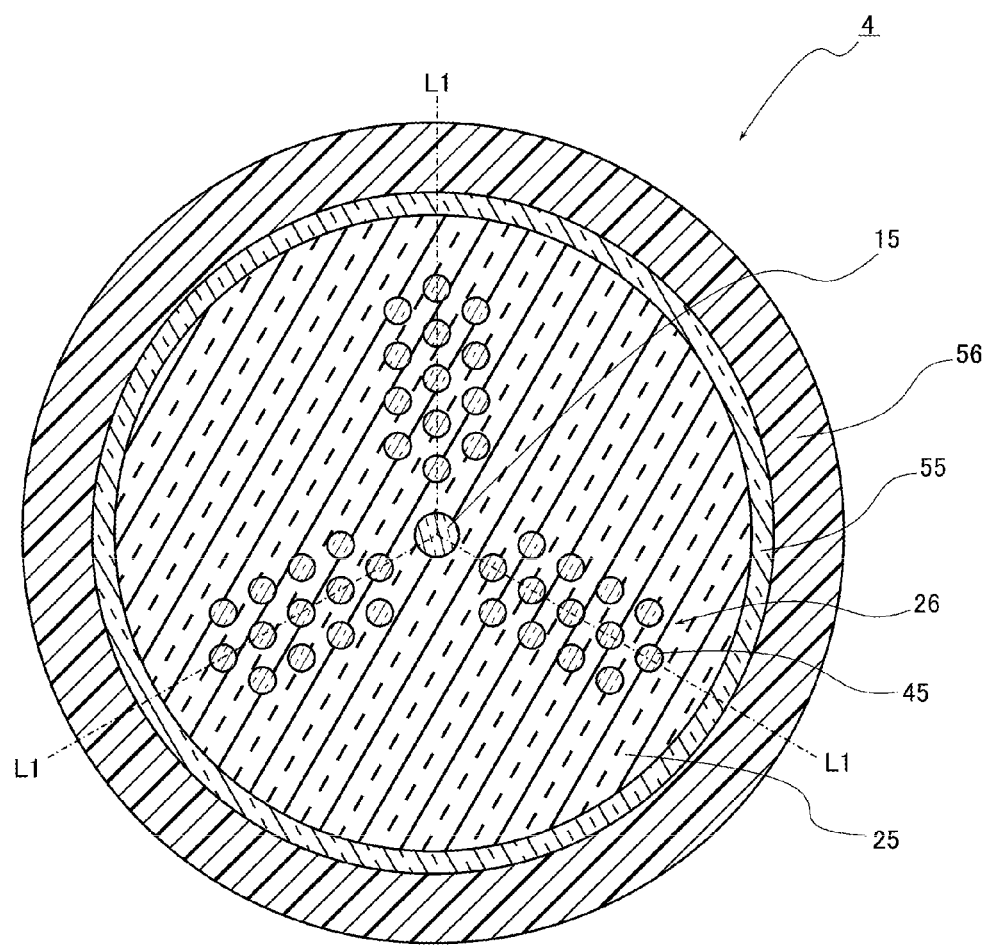
FIG. 18 is a sectional view illustrating the structure in the vertical cross section of a photonic band gap fiber in a length direction according to a sixth embodiment of the present invention.
Figure 19:
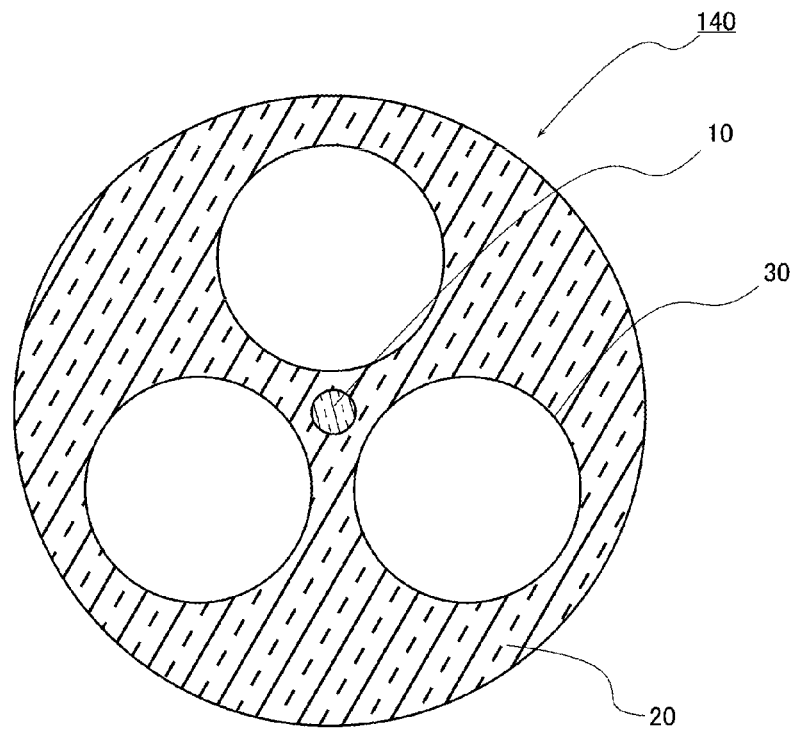
FIG. 19 is a sectional view illustrating the structure in the vertical cross section of an intermediate base material in the length direction after hole making step according to the sixth embodiment of the present invention.
Figure 20:
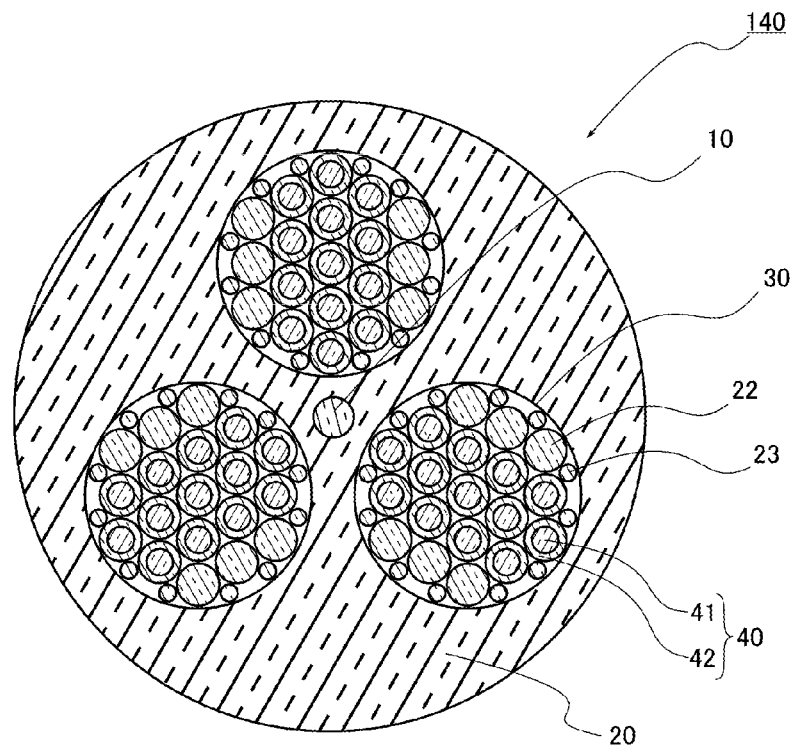
FIG. 20 is a sectional view illustrating the structure in the vertical cross section of the intermediate base material in the length direction after insertion step according to the sixth embodiment of the present invention.
Figure 21:
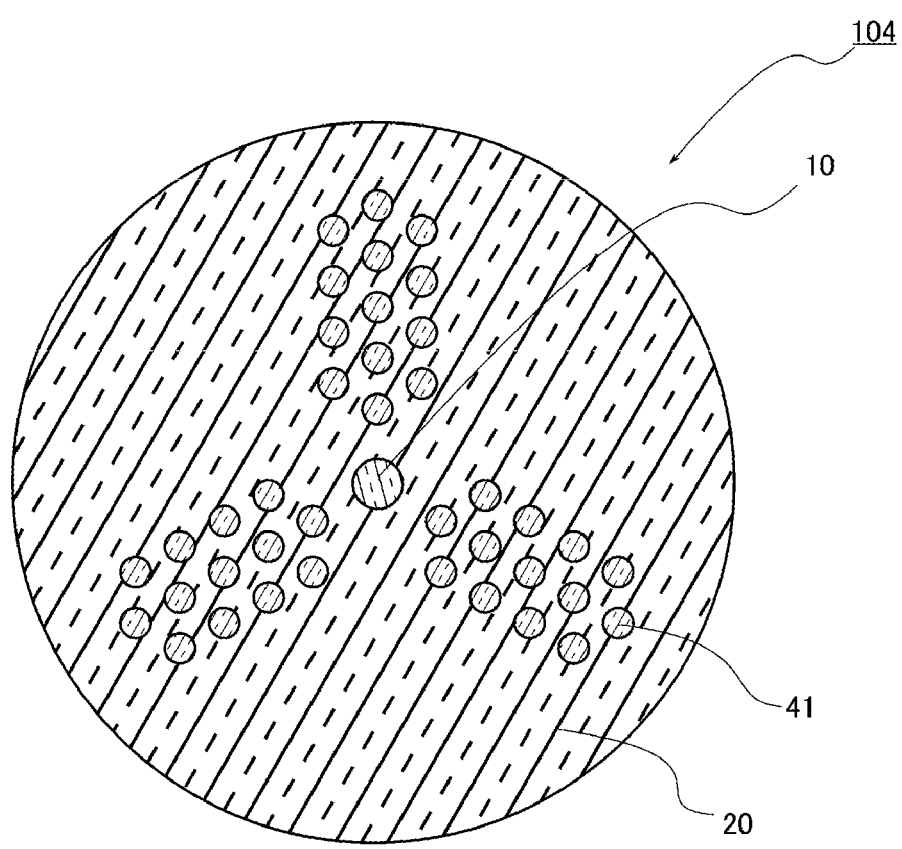
FIG. 21 is a sectional view illustrating the structure in the vertical cross section of the base material in the length direction after heating step according to the sixth embodiment of the present invention.

Next, a sixth embodiment of the present invention will be described in detail with reference to FIGS. 18 to 21. Here, components that are identical or similar to those in the first embodiment are indicated by the same reference numerals and the same explanation will not be repeated. FIG. 18 is a sectional view illustrating a structure in a vertical cross section of a PBGF in a length direction according to the sixth Embodiment of the present invention, FIG. 19 is a sectional view illustrating the structure in the vertical cross section of an intermediate base material in the length direction after hole making step according to the present embodiment, FIG. 20 is a sectional view illustrating the structure in the vertical cross section of the intermediate base material in the length direction after insertion step according to the present embodiment and FIG. 21 is a sectional view illustrating the structure in the vertical cross section of the base material in the length direction after heating step according to the present embodiment.

As illustrated in FIG. 18, a PBGF 4 according to the present embodiment differs from the PBGF 1 according to the first embodiment in that, in the cross section of the PBGF 4, three periodic structure areas 26 formed with a plurality of high refractive index portions 41 are formed around a core 15.

Further, similar to the first embodiment, with the PBGF 4, in each periodic structure area 26, part of high refractive index portions 45 are aligned in one line to overlap a line L1 extending in a radial direction passing the center of the PBGF 4 in the cross section of the PBGF 4. Further, the other high refractive index portions 45 are aligned in a triangular grid pattern such that the distances between adjacent high refractive index portions 45 are equal. In addition, in the adjacent periodic structure areas 26, the lines L1 overlapping alignment of the high refractive index portions 45 form 120 degrees with respect to each other.

With the PBGF 4 employing this configuration, the number of periodic structure areas 26 increases to three, so that, when the PBGF is used as a filter, it is possible to significantly increase the attenuation amount of the wavelength transmission of which is not allowed. Further, the number of periodic structure areas 26 increases to three, and the thermal stress to be applied to the core 15 has threefold symmetry, so that it is possible to decrease the birefringence of the core 15.

With the method of manufacturing the PBGF 4, forming step s1 is performed in the same way as forming step s1 according to the first embodiment to obtain the intermediate base material 100 illustrated in FIG. 3.

Next, in hole making step s2, three holes 30 are formed along the length direction of the core glass body 10 to surround a core glass body 10. Thus, an intermediate base material 140 illustrated in FIG. 19 is obtained.

Next, in insertion step s3, the bilayer glass rods and glass rods 22 and 23 are inserted in the respective holes 30 of the intermediate base material 140. The bilayer glass rods 40 and glass rods 22 and 23 only need to be inserted in the same way as in the first embodiment. Thus, the intermediate base material 140 is obtained in which the bilayer glass rods 40 and glass rods 22 and 23 illustrated in FIG. 20 are inserted in the three holes 30.

Next, similar to heating step s4 according to the first embodiment, the intermediate base material 140 in which, for example, the bilayer glass rods 40 are inserted is heated to obtain a PBGF base material 104 illustrated in FIG. 21.

Then, similar to the first embodiment illustrated in FIG. 7, drawing step s5 is performed to obtain the PBGF 4 illustrated in FIG. 18.

Seventh Embodiment

Figure 22:
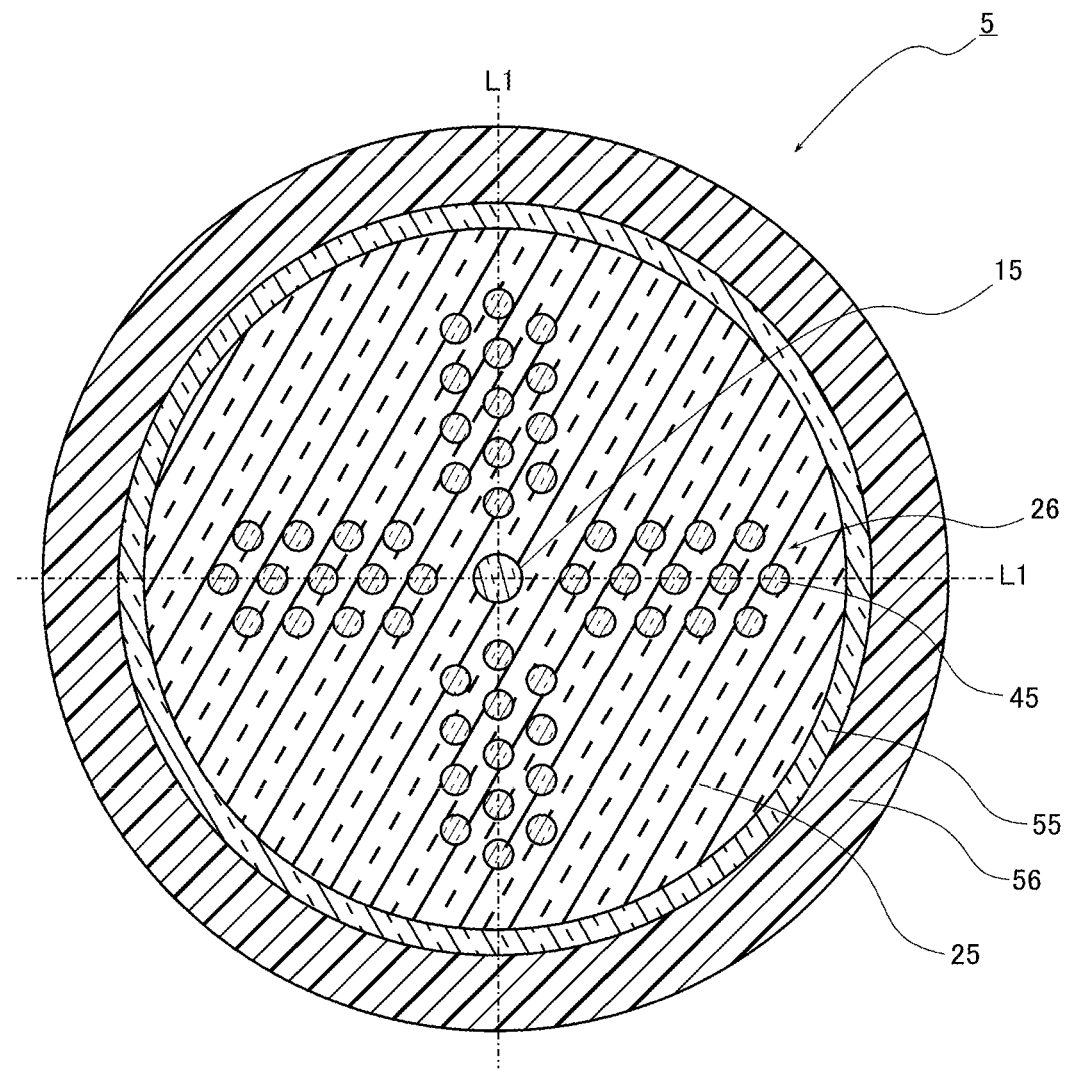
FIG. 22 is a sectional view illustrating a structure in a vertical cross section of a photonic band gap fiber in a length direction according to a seventh embodiment of the present invention.
Figure 23:
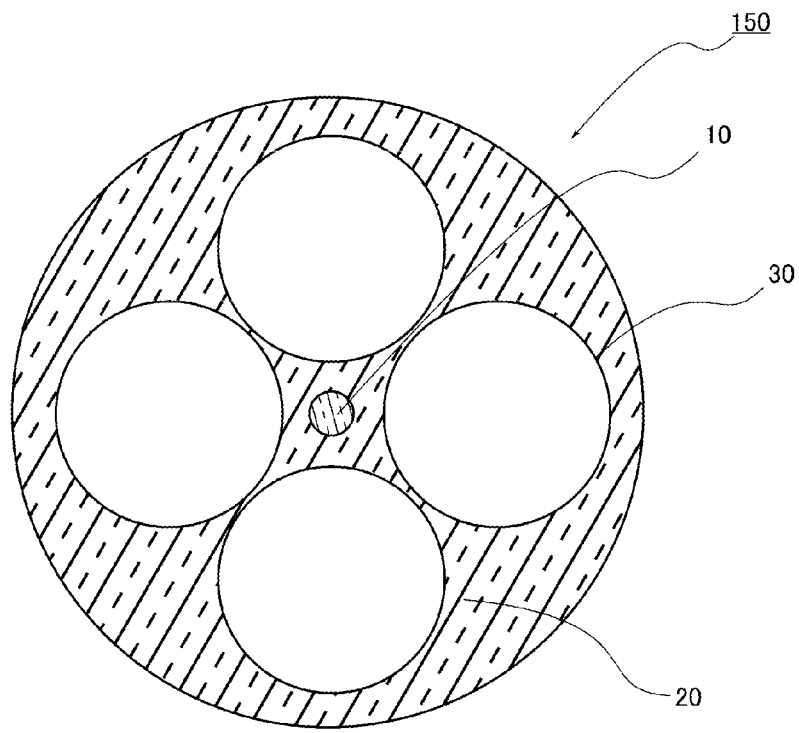
FIG. 23 is a sectional view illustrating the structure in the vertical cross section of the intermediate base material in the length direction after hole making step according the seventh embodiment of the present invention.
Figure 24:
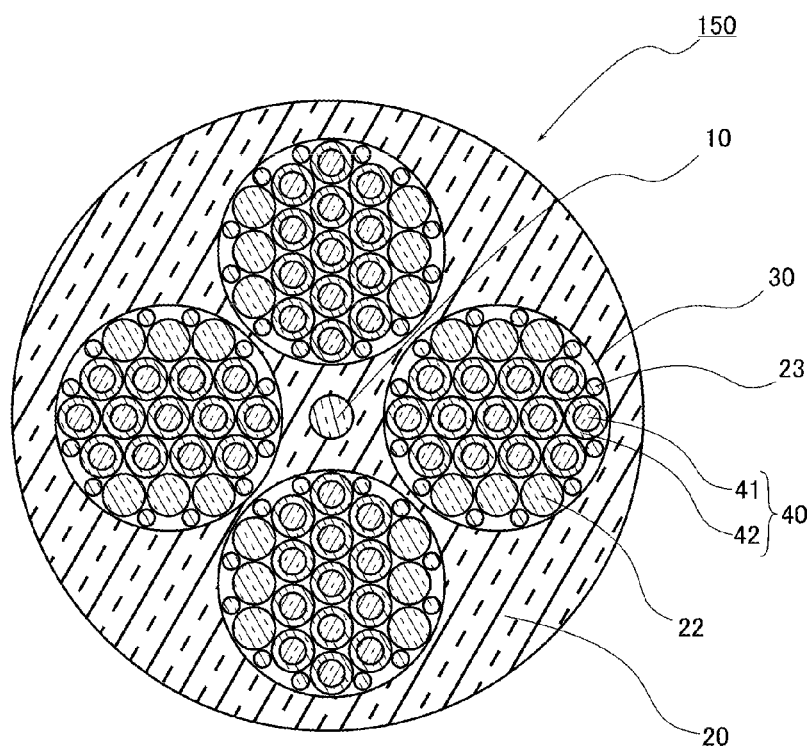
FIG. 24 is a sectional view illustrating the structure in the vertical cross section of the intermediate base material in the length direction after insertion step according to the seventh embodiment of the present invention.
Figure 25:
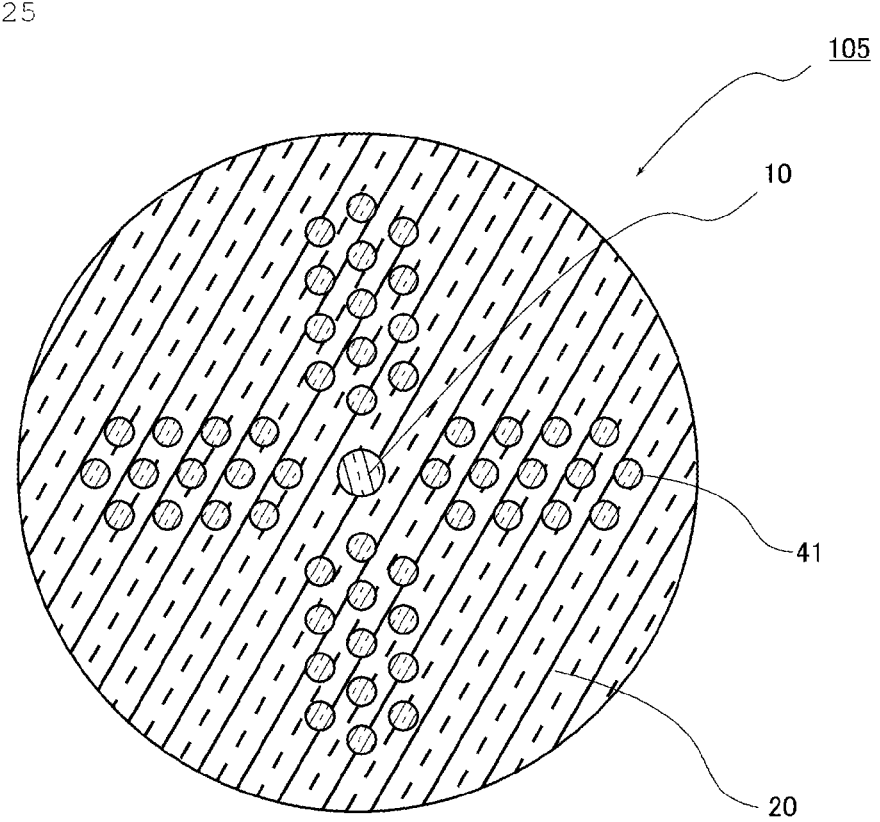
FIG. 25 is a sectional view illustrating the structure in the vertical cross section of the photonic band gap fiber base material in the length direction after heating step according to the seventh embodiment of the present invention.

Next, a seventh embodiment of the present invention will be described in detail with reference to FIGS. 22 to 25. Here, components that are identical or similar to those in the first embodiment are indicated by the same reference numerals and the same explanation will not be repeated. FIG. 22 is a sectional view illustrating a structure in a vertical cross section of a PBGF in a length direction according to the seventh embodiment of the present invention, FIG. 23 is a sectional view illustrating the structure in the vertical cross section of an intermediate base material in the length direction after hole making step according to the present embodiment, FIG. 24 is a sectional view illustrating the structure in the vertical cross section of the intermediate base material in the length direction after insertion step according to the present embodiment and FIG. 25 is a sectional view illustrating the structure in the vertical cross section of the base material in the length direction after heating step according to the present embodiment.

As illustrated in FIG. 22, a PBGF 5 according to the present embodiment differs from the PBGF 1 according to the first embodiment in that, in the cross section of the PBGF 5, four periodic structure areas 26 formed with a plurality of high refractive index portions 41 are formed around a core 15.

Further, similar to the first embodiment, with the PBGF 5, in each periodic structure area 26, part of high refractive index portions 45 are aligned in one line to overlap a line L1 extending in a radial direction passing the center of the PBGF 5 in the cross section of the PBGF 5. Furthermore, the other high refractive index portions 45 are aligned in a triangular grid pattern such that the distances between adjacent high refractive index portions 45 are equal. In addition, in the adjacent periodic structure areas 26, the lines L1 overlapping alignment of the high refractive index portions 45 are vertical with respect to each other.

With the PBGF 5 employing this configuration, the number of periodic structure areas 26 increases to four, so that, when the PBGF is used as a filter, it is possible to significantly increase the attenuation amount of the wavelength transmission of which is not allowed. Further, the number of periodic structure areas 26 increases to four, and the thermal stress to be applied to the core 15 has fourfold symmetry, so that it is possible to decrease the birefringence of the core 15.

With the method of manufacturing the PBGF 5, forming step s1 is performed in the same way as forming step s1 according to the first embodiment to obtain the intermediate base material 100 illustrated in FIG. 3.

Next, in hole making step s2, the four holes 30 are formed along the length direction of the core glass body 10 to surround a core glass body 10. Thus, an intermediate base material 150 illustrated in FIG. 23 is obtained. In this case, the respective holes 30 are formed such that the line connecting the centers of the holes 30 facing each other across the core glass body 10 overlaps the line passing the center of the core glass body 10.

Next, in insertion step s3, the bilayer glass rods and glass rods 22 and 23 are inserted in the respective holes 30 of the intermediate base material 150. The bilayer glass rods 40 and glass rods 22 and 23 only need to be inserted in the same way as in the first embodiment. Thus, the intermediate base material 150 is obtained in which the bilayer glass rods 40 and glass rods 22 and 23 illustrated in FIG. 24 are inserted in the four holes 30.

Next, similar to heating step s4 according to the first embodiment, the intermediate base material 150 in which, for example, the bilayer glass rods 40 are inserted is heated to obtain a PBGF base material 105 illustrated in FIG. 25.

Then, similar to the first embodiment illustrated in FIG. 7, drawing step s5 is performed to obtain the PBGF 5 illustrated in FIG. 22.

Although the present invention has been described above with reference to the first to seventh embodiments as examples, the present invention is by no means limited thereto.

Although, with the first to seventh embodiments, the protective layer 56 coats the outer periphery of the resin clad 55, the protective layer 56 is not necessarily required with the present invention, and a configuration without the protective layer 56 is also possible. Further, a configuration without the resin clad 55 and protective layer 56 is also possible.

Furthermore, with the first to fifth embodiments, a configuration is also possible where the shape of the core 15 is oval in the vertical cross section of the PBGF in a longitudinal direction. More specifically, the direction connecting the two high refractive index areas 26 and a long axis of the oval shape of the core are configured to overlap, and a direction vertical to the direction connecting the two high refractive index areas 26 and the short axis of the oval shape of the core are configured to overlap. The PBGF can increase the birefringence of the core. The PBGF is formed as follows. For example, with the first embodiment, when the cross sectional shape of the core 15 is oval, gaps are made to insert the glass rods 22 and 23 in insertion step s3. By inserting the glass rods 22 and 23 in this way, in heating step s4, the stress to pull the core glass body 10 in the direction of the two holes 30 is applied to the core glass body 10 to fill the gaps. Thus, the core is formed such that the core glass body 10 stretches toward the direction of the two holes 30, and the cross sectional shape of the core becomes oval. Also with the second to fifth embodiments, in insertion step s3, by making gaps when the glass rods 22 and 23 are inserted, it is possible to obtain a PBGF with a core having an oval cross sectional shape.

Further, with each embodiment, it is possible to flexibly adjust the position to make a hole according to a PBGF to be manufactured.

Further, although, with the first embodiment, heating step s4 and drawing step s5 are individually performed, heating step s4 and drawing step s5 may be simultaneously performed. In this case, in a state where the bilayer glass rods 40 and glass rods 22 and 23 are inserted in a pair of holes 30, the interiors of the holes 30 are vacuumed by a jig (not illustrated) to perform heating and drawing. By so doing, the thermal stress of the high refractive index portions 41 can prevent the PBGF base material 101 from being cracked.

Further, with the second embodiment, in the cross section of the PBGF 2, alignment of the high refractive index portions 41 in one periodic structure area 26 and alignment of the high refractive index portions 41 in the other periodic structure area 26 are symmetrical with respect to one line Ls passing the center of the PBGF 2. However, the present invention is by no means limited thereto, alignment of the high refractive index portions 41 in one periodic structure area 26 and alignment of the high refractive index portions 41 in the other periodic structure area 26 may be symmetrical with respect to the point of the center of the PBGF. The PBGF can be manufactured by, in insertion step according to the second embodiment, inserting a plurality of bilayer glass rods 40 such that alignment of the bilayer glass rods 40 to be inserted in one hole 30 and alignment of the bilayer glass rods 40 to be inserted in the other hole 30 are symmetrical with respect to the point of the center of the intermediate base material 110. Instead, with the second embodiment, alignments of the high refractive index portions 41 in the two periodic structure areas 26 do not need to be symmetrical to each other in the cross section of the PBGF 2.

Further, according to, for example, the third embodiment, as illustrated in FIG. 11, with the intermediate base material 120, the respective holes 31 are formed such that, in the cross section of the intermediate base material 100, a line connecting a pair of apexes facing each other in the peripheries of the holes 31 passes the center of the intermediate base material 100 and overlaps the line L1 extending in the radial direction of the intermediate base material 100. However, the present invention is by no means limited thereto, and the holes 31 may be formed such that, in, for example, the cross section of an intermediate base material, a line vertical to a pair of sides facing each other in the peripheries of the respective holes 31 passes the center of the intermediate base material 100 and overlaps the line extending in the radial direction of the intermediate base material 100. Further, the respective holes 31 may be rotated in different directions.

Furthermore, although, with the sixth embodiment and seventh embodiment, part of the high refractive index portions 45 in respective periodic structure areas 26 are aligned in one line to overlap the line L1 extending in the radial direction passing the centers of the PBGFs 4 and 5 in the cross sections of the PBGFs 4 and 5, the present invention is by no means limited thereto. For example, the high refractive index portions 45 in the respective periodic structure areas 26 may be aligned without overlapping the line extending in the radial direction passing the centers of the PBGFs 4 and 5 in the cross sections of the PBGFs 4 and 5.

Further, although, with each embodiment, the PBGFs 1 to 5 are configured such that the outer periphery of the clad 25 is coated by the resin clad 55, the outer periphery of the clad 25 does not necessarily need to be coated by the resin clad 55.

EXAMPLES

Hereinafter, the present invention will be more concretely described with examples and a comparative example, but the present invention is by no means limited thereto.

Example 1

The same PBGF as in the first embodiment was manufactured in the same way as the manufacturing method according to the first embodiment. The intermediate base material in this case was manufactured according to the MCVD method. Further, the cross sectional shape of the core was made oval, and the two diameters in directions orthogonal to each other were 14.4 µm and 9.8 µm. Further, the outer diameter of a clad was 154 µm, the outer diameter of a resin clad was 180 µm and the outer diameter of a protective layer was 260 µm. Further, the diameter of the high refractive index portions was 4.7 µl, and the distance (pitch) between the centers of the high refractive index portions was 7.5 µm. Further, the length of the PBGF was 21 m. Further, the core was made of silica which was codoped with Yb of 9000 ppm by weight and Al of 6000 ppm by weight, the clad was made of silica which was doped with no dopant, the resin clad was made of fluorinated acrylate having the refractive index of 1.38, the protective layer was made of acrylate having the refractive index of 1.5 and the high refractive index portions were made of silica which was doped with 18 moles of Ge.

With the PBGF, the relative refractive index difference of the high refractive index portions with respect to the clad was 2.8%, and the relative refractive index difference of the high refractive index portions with respect to the clad of the core was 0.15%.

Next, transmission loss was studied by allowing transmission of light in the PBGF at the wavelength of 1180 nm. The transmission loss in this case was 19 dB/km.

Further, DGD (Differential Group Delay) was measured at around the wavelength of 1300 nm. As a result, DGD was 0.54 ps/m. Further, the group birefringence was $1.6 \times 10^{-4}$. This showed a birefringence which sufficiently functioned as a polarization maintaining fiber.

Figure 26:
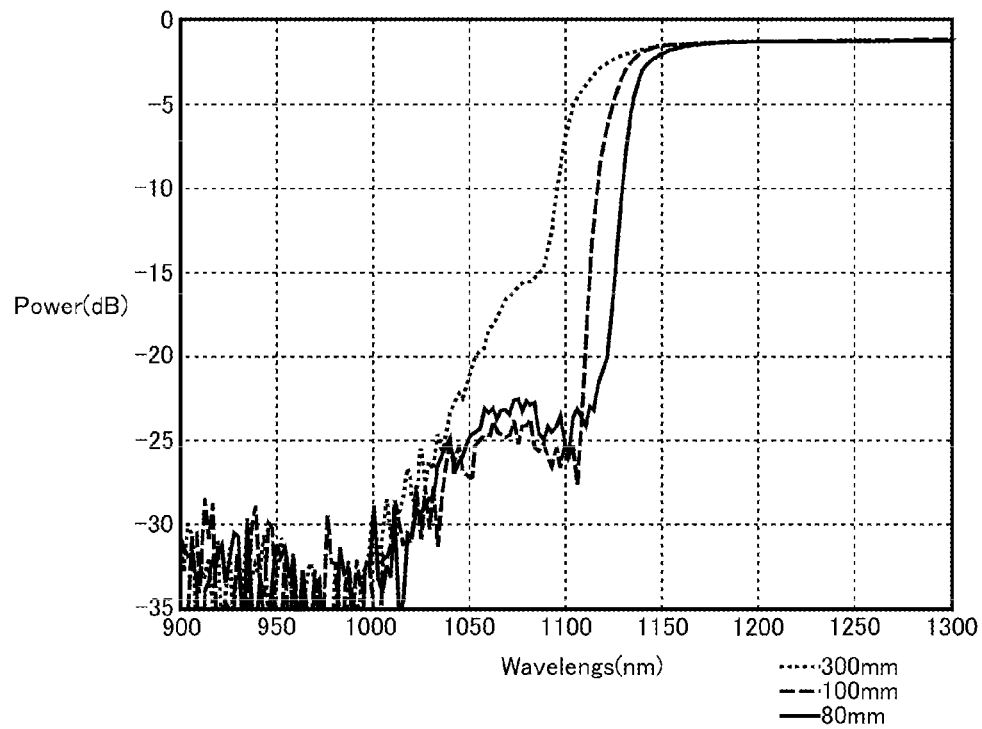
FIG. 26 is a view illustrating transmittance characteristics of a photonic band gap fiber according to Example 1.

Next, filter characteristics was studied when a PBGF had a loop shape having the diameters of 300 mm, 100 mm and 80 mm. The result is shown in FIG. 26. It was found that the PBGF manufactured as illustrated in FIG. 26 functions as a wavelength selection filter having a threshold at around the wavelength of 1100 cm.

Example 2

Next, the same PBGF as in the fourth embodiment is manufactured in the same way as the manufacturing method according to the fourth embodiment. The intermediate base material in this case was manufactured according to the MCVD method. Further, the PBGF manufactured in this case was the same as in the Example 1 except that the high refractive index portions were aligned as illustrated in FIG. 13.

Next, similar to the Example 1, transmission loss was studied by allowing transmission of light in the PBGF at the wavelength of 1180 nm. The transmission loss in this case was 25 dB/km.

Further, the group birefringence was $2.5 \times 10^{-4}$. Consequently, it was found that the capacity to maintain polarization further increased.

Comparative Example 1

Figure 27:
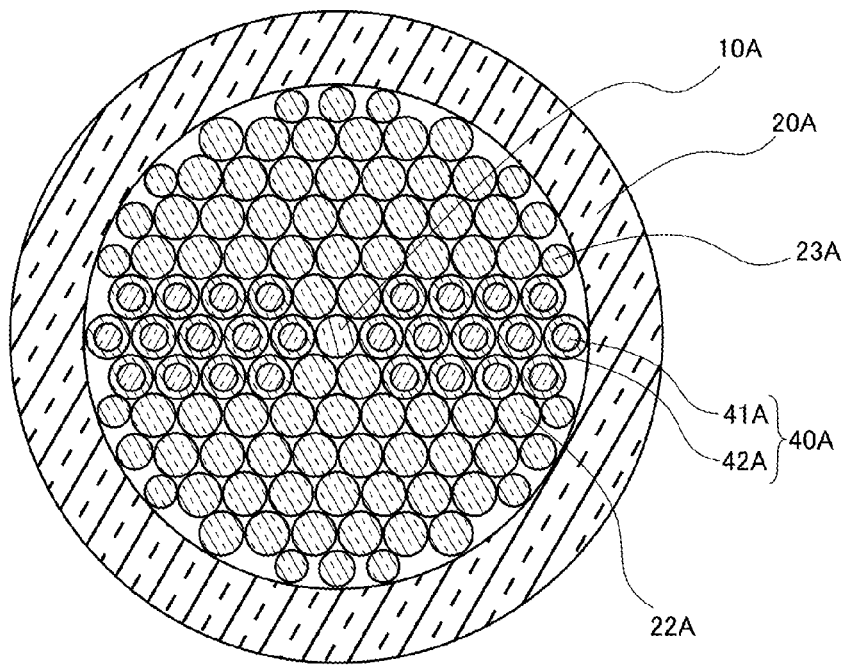
FIG. 27 is a sectional view illustrating process of manufacturing a photonic band gap fiber base material when a conventional technique is applied.

Next, the same PBGF as in the Example 1 was manufactured. In this case, the PBGF was manufactured in the same way as in the Example 1 except that the intermediate base material illustrated in FIG. 27 was used.

Next, transmission loss was studied by allowing transmission of light in the manufactured PBGF at the wavelength of 1180 nm. The transmission loss in this case was 150 dB/km.

In view of above, the PBGFs according to the Examples 1 and 2 have less transmission loss than the PBGF according to the Comparative Example 1, and the PBGF manufactured by the method of manufacturing the PBGF according to the present invention can suppress transmission loss of light.

INDUSTRIAL APPLICABILITY

The present invention provides a method of manufacturing a photonic band gap fiber base material which can manufacture a photonic band gap fiber which can suppress transmission loss of light, and a method of manufacturing a photonic band gap fiber.

DESCRIPTION OF REFERENCE NUMERALS 1, 2, 3, 4, 5 . . . PHOTONIC BAND GAP FIBER (PBGF)
10 . . . CORE GLASS BODY
15 . . . CORE
20 . . . CLAD GLASS BODY
22, 23, 24 . . . GLASS ROD
25 . . . CLAD
26 . . . PERIODIC STRUCTURE AREA
30, 31, 33 . . . HOLE
40 . . . BILAYER GLASS ROD
41 . . . HIGH REFRACTIVE INDEX PORTION
42 . . . OUTER LAYER
45 . . . HIGH REFRACTIVE INDEX PORTION
55 . . . RESIN CLAD
56 . . . PROTECTIVE LAYER
61 . . . HEATING FURNACE
62 . . . COOLING DEVICE
63, 65 . . . COATING DICE
64, 66 . . . ULTRAVIOLET RAY RADIATING DEVICE
67 . . . PULLEY
68 . . . BOBBIN
100, 110, 120, 130, 140, 150 . . . INTERMEDIATE BASE MATERIAL
101, 102, 103, 104, 105 . . . PHOTONIC BAND GAP FIBER BASE MATERIAL (PBGF BASE MATERIAL)
s1 . . . FORMING STEP
s2 . . . HOLE MAKING STEP
s3 . . . INSERTION STEP
s4 . . . HEATING STEP
s5 . . . DRAWING STEP

The invention claimed is:

1. A method of manufacturing a photonic band gap fiber base material comprising:
   a forming step of continuously forming a columnar core glass body which becomes a core and a clad glass body which becomes a clad and coats an outer periphery of the core glass body to obtain an intermediate base material;
   a hole making step of making a plurality of holes around the core in the clad glass body along a longitudinal direction of the core glass body;
   an insertion step of inserting in each of the holes a plurality of bilayer glass rods which have a columnar high refractive index portion having a higher refractive index than a refractive index of the clad glass body and an outer layer which has the same refractive index as the clad glass body and coats an outer periphery of the high refractive index portion; and a heating step of heating the intermediate base material in which the bilayer glass rods are inserted in the holes and integrating the intermediate base material and the bilayer glass rods.

2. The method of manufacturing a photonic band gap fiber base material according to claim 1, wherein a shape of a periphery of the holes is circular in a vertical cross section of the intermediate base material in a length direction.

3. The method of manufacturing a photonic band gap fiber base material according to claim 1, wherein a shape of a periphery of the holes is regular hexagonal in a vertical cross section of the intermediate base material in a length direction.

4. The method of manufacturing a photonic band gap fiber base material according to claim 1, wherein a shape of a periphery of the holes in a vertical cross section of the intermediate base material in a length direction has an outer periphery of two partially overlapping circles having the same diameter.

5. The method of manufacturing a photonic band gap fiber base material according to claim 4, wherein, in the insertion step, a glass rod which has a cross sectional shape from which part of a circle having a slightly smaller diameter than the two circles is linearly cut, and which has the same refractive index as the clad glass is inserted together with the bilayer glass rods.

6. The method of manufacturing a photonic band gap fiber base material according to any one of claims 1 to 5, wherein the core glass body is doped with a rare earth element.

7. A method of manufacturing a photonic band gap fiber comprising:
   a forming step of continuously forming a columnar core glass body which becomes a core and a clad glass body which becomes a clad and coats an outer periphery of the core glass body to obtain an intermediate base material;
   a hole making step of making a plurality of holes around the core in the clad glass body along a longitudinal direction of the core glass body;
   an insertion step of inserting in each of the holes a plurality of bilayer glass rods which have a columnar high refractive index portion having a higher refractive index than a refractive index of the clad glass body and an outer layer which has the same refractive index as the clad glass body and coats an outer periphery of the high refractive index portion;
   a heating step of heating the intermediate base material in which the bilayer glass rods are inserted in the holes and integrating the intermediate base material and the bilayer glass rod to obtain a photonic band gap fiber base material; and
   a drawing step of heating and drawing the photonic band gap fiber base material.

8. The method of manufacturing a photonic band gap fiber according to claim 7, wherein a shape of a periphery of the holes is circular in a vertical cross section of the intermediate base material in a length direction.

9. The method of manufacturing a photonic band gap fiber according to claim 7, wherein a shape of a periphery of the holes is regular hexagonal in a vertical cross section of the intermediate base material in a length direction.

10. The method of manufacturing a photonic band gap fiber according to claim 7, wherein a shape of a periphery of the holes in a vertical cross section of the intermediate base material in a length direction has an outer periphery of two partially overlapping circles having the same diameter.

11. The method of manufacturing a photonic band gap fiber according to claim 10, wherein, in the insertion step, a glass rod which has a cross sectional shape from which part of a circle having a slightly smaller diameter than the two circles is linearly cut, and which has the same refractive index as the clad glass is inserted together with the bilayer glass rods.

12. The method of manufacturing a photonic band gap fiber according to any one of claims 7 to 11, wherein the core glass body is doped with a rare earth element.

13. The method of manufacturing a photonic band gap fiber according to any one of claims 7 to 11, wherein the heating step and the drawing step are simultaneously performed.

* * * * *